(12) United States Patent
Alexander

(10) Patent No.: US 7,756,340 B2
(45) Date of Patent: Jul. 13, 2010

(54) METHOD AND APPARATUS FOR IDENTIFYING AND/OR REMOVING COMBS FROM SCANNED IMAGES

(75) Inventor: M. Scot Alexander, Stillwater, OK (US)

(73) Assignee: Pegasus Imaging Corporation, Tampa, FL (US)

( * ) Notice: Subject to any disclaimer, the term of this patent is extended or adjusted under 35 U.S.C. 154(b) by 1036 days.

(21) Appl. No.: 11/484,844

(22) Filed: Jul. 11, 2006

(65) Prior Publication Data

US 2008/0013833 A1    Jan. 17, 2008

(51) Int. Cl.
  *G06K 9/46* (2006.01)
  *G06K 9/34* (2006.01)
(52) U.S. Cl. .................. 382/192; 382/175; 382/177; 382/203
(58) Field of Classification Search .......... 382/175, 382/177, 179, 181, 184, 186, 187, 190, 192, 382/199, 202, 203, 209, 224
See application file for complete search history.

(56) References Cited

U.S. PATENT DOCUMENTS 6,850,645 B2 * 2/2005 Naoi et al. ............... 382/190

OTHER PUBLICATIONS

Niyogi et al., Analysis of Printed Forms, Handbook on O.C>R. and Document Image Analysis, World Scientific Pub. Co., 1996, pp. 1-18.*
Wang et al., Analysis of Form Images, Int'l Journal of Pattern Recognition and Artificial Intelligence, vol. 8, No. 5, 1994, pp. 1031-1052.*

* cited by examiner

*Primary Examiner*—Tom Y Lu
*Assistant Examiner*—Thomas A Conway
(74) *Attorney, Agent, or Firm*—Straub & Pokotylo; Michael P. Straub

(57) ABSTRACT

Methods and apparatus for detecting the presence of combs, determining their shape and removing the combs from a scanned form in an automated manner are described. Horizontal and vertical line feature analysis is combined with knowledge of the usual size, shape, and spacing characteristics of lines which form a comb. Vertical and horizontal lines failing to meet certain characteristics, e.g., size or shape characteristics, are eliminated from consideration. Vertical lines which do not intersect a horizontal line are also eliminated from consideration. Confidence measures for different possible comb shapes are generated and the most probable comb shapes as indicated by the confidence measures are included in a comb list. The comb list may be output for use in further processing, e.g., comb removal and/or data extraction processing.

16 Claims, 26 Drawing Sheets

300

Forms may contain more than one tooth spacing  ← 302
|H|a|r|r|y| |S| |T|r|u|m|a|n|
|1|6|0|0| |P|e|n|n|s|y|l|v|a|n|i|a| |A|v|e|
  ← 304

Overview of comb detection method

Overview of comb detection method

Horizontal line detection method

Finding candidate vertical lines method

Potential tooth spacing calculation method

Generate deltas method for vertical lines

Method of low pass filter of histrogram

Method of searching for peaks in spacings histogram

Method of handling peaks in spacing histogram

Method of assembling potential combs

Method of validating potential tooth

Method of Calculating comb height

Method of associating vertical lines with horizontal lines

Method of checking for top butted vertical line

Method of checking for bottom butted vertical line

Method of Checking for intersecting vertical line

Method of Looking for next tooth

METHOD AND APPARATUS FOR IDENTIFYING AND/OR REMOVING COMBS FROM SCANNED IMAGES

FIELD OF THE INVENTION

The present invention relates to the field of automated processing of forms and, more particularly, to methods and apparatus for detecting and/or removing combs from a form, e.g., a scanned form.

BACKGROUND OF THE INVENTION

In certain areas, like government, health care, human resources, and insurance, the daily processing of a variety of paper forms is a routine and important activity. The processing of a form often involves: the extraction of the information on the form supplied by the users; specific actions that are governed by the specific nature of the extracted information; and, possibly, the archiving of the extracted information and/or the form itself in a manner that facilitates subsequent use of the archival information. While all of these steps can, and often are, performed by a human, the processing of large number of forms on a timely basis by means of digital computing devices would be desirable.

One common step in the automation of forms handling is the digitization of one or more forms by means of an appropriate scanning device. The result of the scanning process is a set of information representing the digitized form. The set of information is normally a rectangular array of pixel elements—an "image"—of dimensions W and H where the "width", W, is the number of pixels in each horizontal row of the array and the "height", H, is the number of pixels in each vertical column of the pixel array. The columns may be identified, for purpose of discussing such a set of information, by an index, I, whose values can range from 0 to W−1; and the rows can be identified by an index J whose values range from 0 to H−1 where W, H, J and I are integer values. If a pixel array itself is labeled as IMG, then the value of a pixel in the column with index I and row with index J is labeled for discussion purposed as IMG[I,J]. The ordered pair [I,J] is sometimes called the "address" or "pixel location" of this pixel.

While the particular colors that are used on forms can vary from application to application, most forms have only two distinguishing color features, the background color and the foreground color. It is common practice to set the values of all pixels representing the background color to a first number, e.g., 1, and all pixels representing the foreground color to another value, e.g., 0.

Forms frequently include combs which serve as guides for the placement of information on the form. Frequently, one of the goals of processing scanned forms is to extract the entered information from the form for later use and/or storage. While knowledge of an original form can help the extraction process, in order to support a wide range of forms it would be beneficial if an automated process for identifying and extracting combs from a scanned form, without requiring knowledge of the original form's comb arrangement, while preserving the text/information content on the form would be desirable. In particular, it would be desirable if an automated method and apparatus for identify one or more combs on a form could be developed. It would also be desirable if the automated method generated a set of comb information which could then be used to extract the combs from the image being processed.

SUMMARY OF THE INVENTION

Various exemplary embodiments of the invention are directed to an automated process for detecting and optionally removing the presence of one or more combs in a scanned image, e.g., an image of a form, and determining the shape of detected combs.

The methods and apparatus of the present invention rely on horizontal and vertical line analysis and knowledge about the general shape of combs to identify possible comb elements and to generate confidence measures relating to possible comb shapes which might be present as indicated by the presence of lines with particular characteristics.

In identifying possible combs, horizontal lines are first considered. Lines deemed to be too short or too long to be part of a comb are discarded. For example, lines which are shorter than the spacing between text characters would be discarded from consideration as possible horizontal comb line. Horizontal lines which are too thick to be part of a comb are also discarded. For example, a horizontal line which is at least 40% as thick as the height of a text line is not likely to be part of a comb since the large thickness leaves little room for entry of a text character.

After analysis of horizontal lines to eliminate from consideration those lines which are not likely to be horizontal lines of a comb, vertical line analysis is performed. It should be appreciated that text may include vertical lines as parts of letters but that such text character lines may not touch a horizontal line which may be part of a comb. Accordingly, in one embodiment, as part of the vertical line analysis, vertical lines which do not touch a horizontal line which may be part of a comb are eliminated from further consideration.

The spacing of vertical lines which intersect a horizontal line which may be part of a comb are then considered. The process identifies patterns of vertical lines which: i) intersect a horizontal line and ii) exhibit generally uniform vertical line spacing and iii) have the same or approximately the same height. Such characteristics are expected in the case of comb constructions.

Based on the vertical and horizontal line analysis, a set of one or more possible comb shapes is generated. For at least some of the possible comb shapes a confidence measure is generated indicative of the probability that the shape is an actual comb included in the form. In the event of overlapping comb shapes, one or more overlapping combs are removed. A list of combs is then stored or output. In some embodiments, the list of combs is limited to the top most probable combs, e.g., the top two most probable comb shapes, as indicated by the generated confidence measures. Such a limitation on the total number of comb shapes included in the output list is based, in some cases, on the general observation that in order to prevent confusion, the number of different comb shapes in a form, e.g., as indicated by vertical comb line height and spacing, tend to be limited to two or fewer distinct comb shapes.

Once the comb shape list is generated, in some embodiments it is used to extract the detected combs from the scanned image.

In some embodiments the comb information is supplied to an image processing routine which performs comb removal on the scanned image using the supplied information. The processed image with the combs removed is further processed, e.g., subjected to optical character recognition processing, output in a printed form, displayed on a display device, and/or stored in a memory device for later use. In other embodiments, the generated comb information is simply stored on a data storage device for future use and/or output, e.g., to a printer or display. Thus, the processing of the invention which may be implemented using a computer to implement the processing operations, results in a physical result, e.g., the storage or output of an image in a concrete tangible form such as hard copy or as in the form of a machine readable medium physically altered to store the comb information and/or the image resulting from the comb removal process.

While various embodiments have been discussed in the summary above, it should be appreciated that not necessarily all embodiments include the same features and some of the features described above are not necessary but can be desirable in some embodiments. Numerous additional features, benefits and embodiments of the invention will be discussed below in the detailed description.

DETAILED DESCRIPTION

Figure 1:
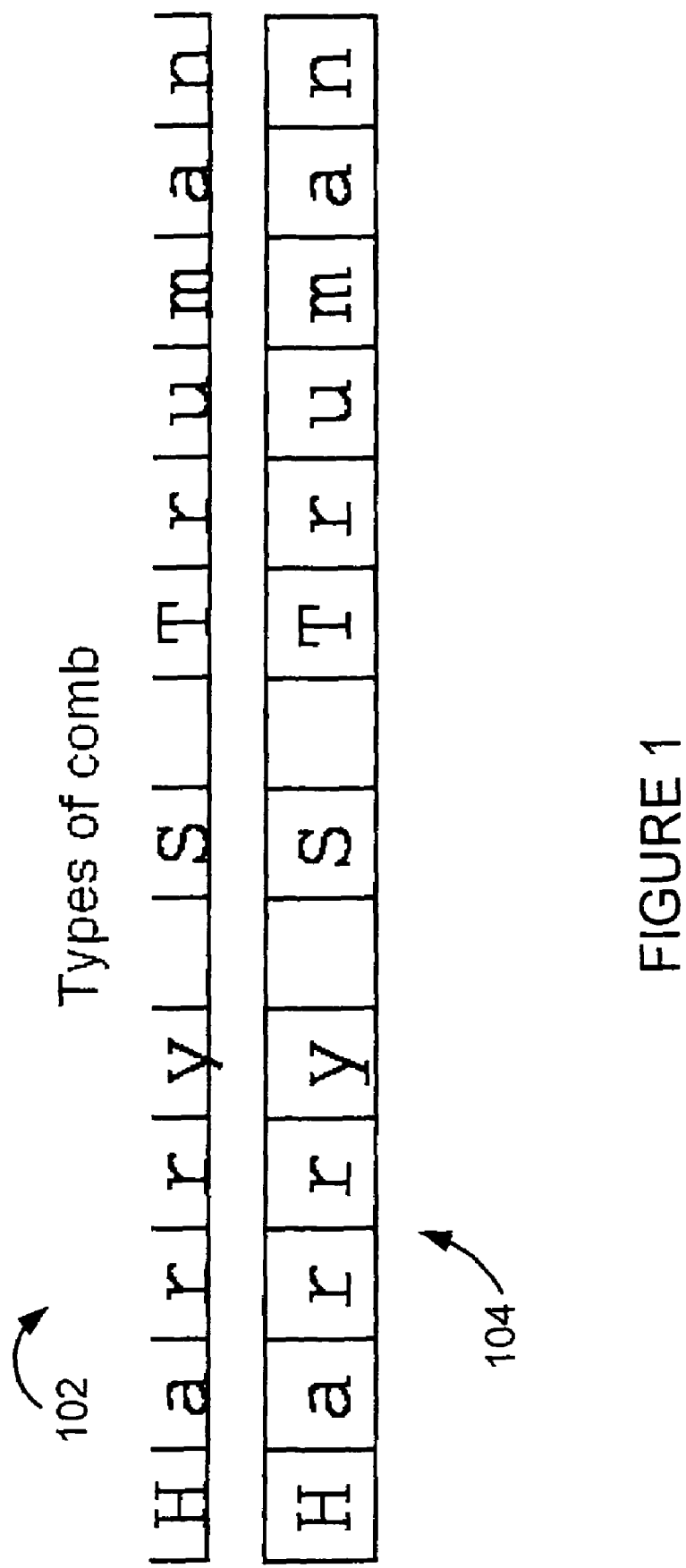
FIG. 1 illustrates two exemplary types of combs, a comb with a single horizontal line and a comb with both a top and bottom horizontal line.

FIG. 1 illustrates two exemplary types of combs, a comb 102 with a single horizontal line and a comb 104 with both a top and bottom horizontal line.

Figure 2:
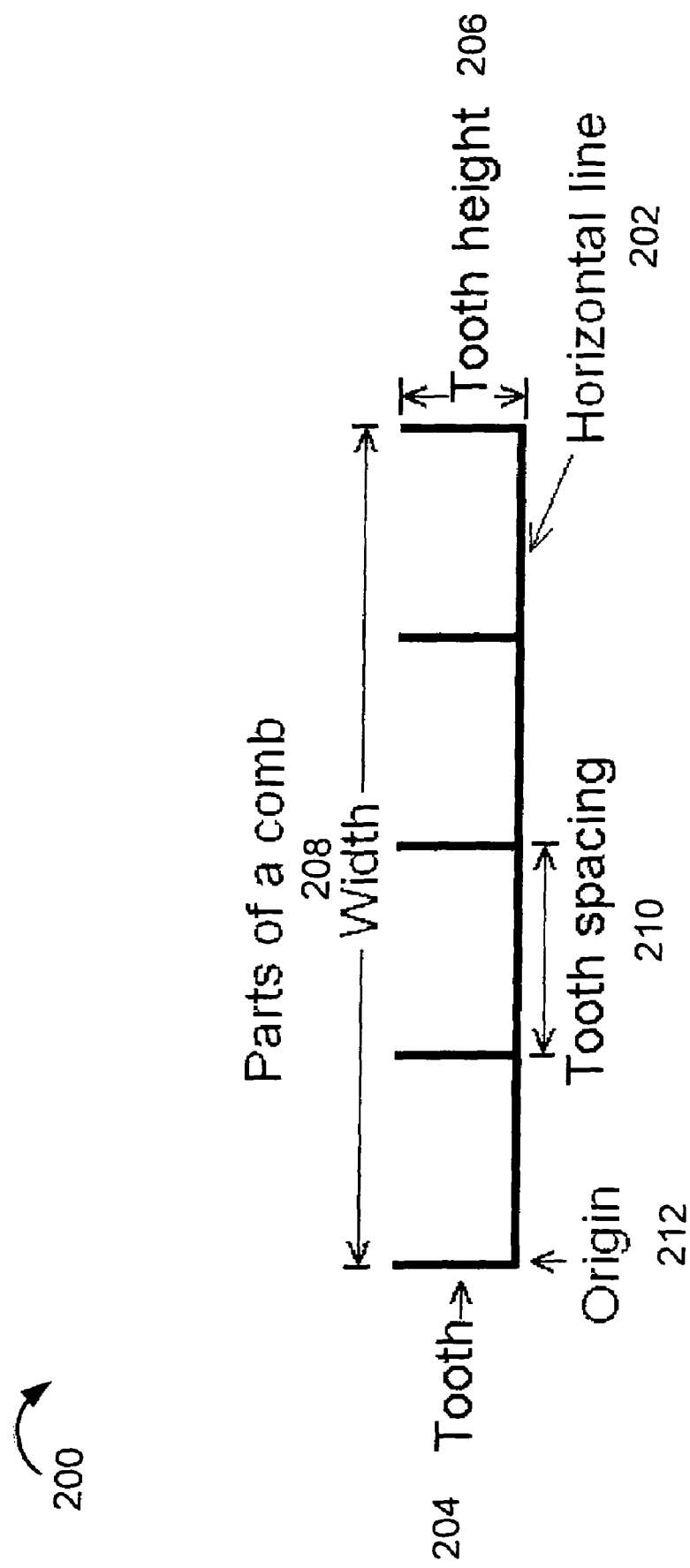
FIG. 2 illustrates the various parts of a comb as well as various line spacing features which may be considered when analyzing a form for the presence of a comb.

FIG. 2 illustrates the various parts of a comb as well as various line spacing features which may be considered when analyzing a form for the presence of a comb. Drawing 200 illustrates that one type of exemplary comb includes a horizontal line 202 and a plurality of vertical teeth as represented by exemplary tooth 204. The exemplary comb has a width 208, a tooth height 206, a tooth spacing 210 and an origin 212.

Figure 3:
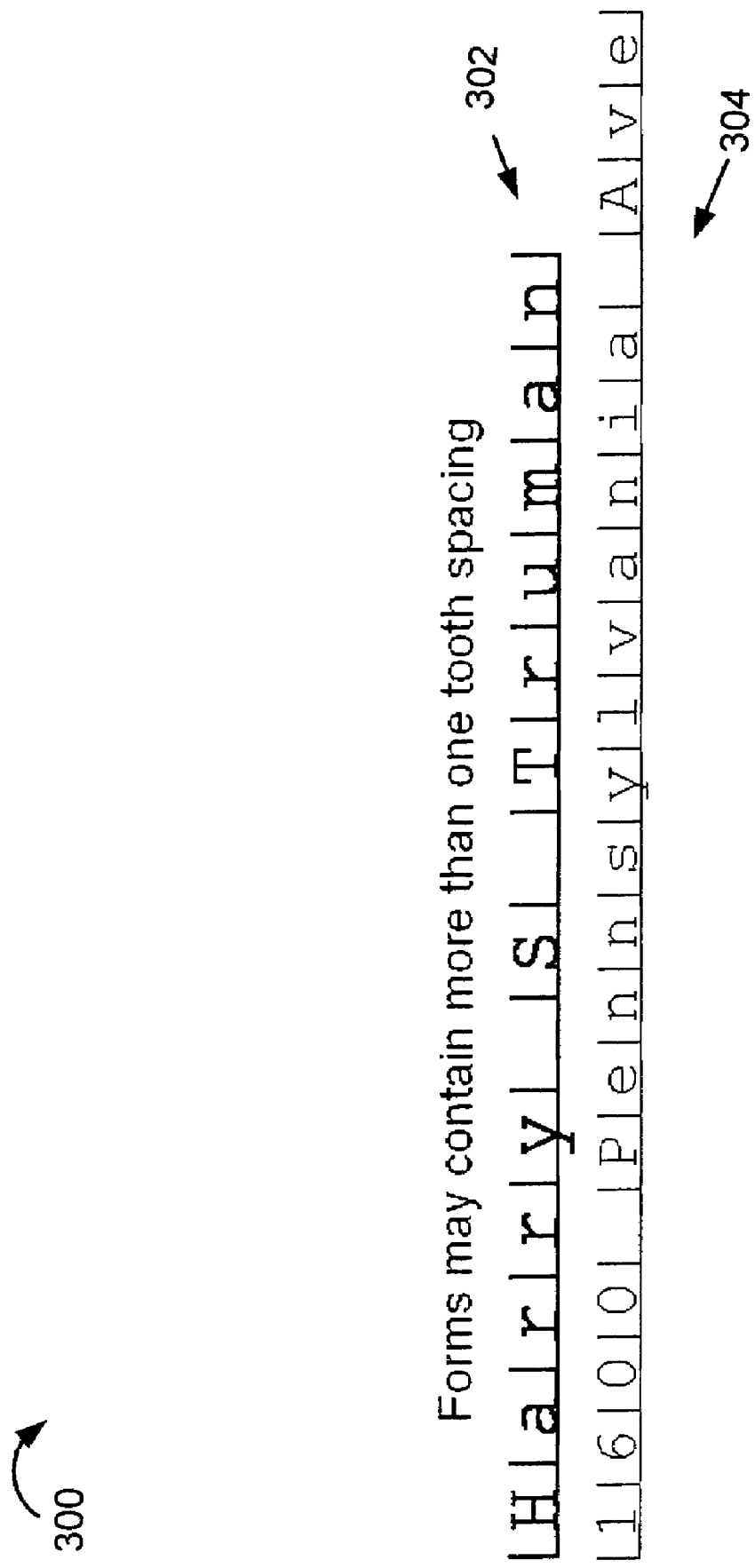
FIG. 3 is an example showing how a single form may include multiple combs with different tooth spacing.

FIG. 3 is a drawing 300 showing an example of how a single form may include multiple combs with different tooth spacing. Drawing 300 of FIG. 3 includes a first exemplary comb 302 and a second exemplary comb 304. First comb 302 has a greater tooth spacing than the second comb 304.

Figure 4:
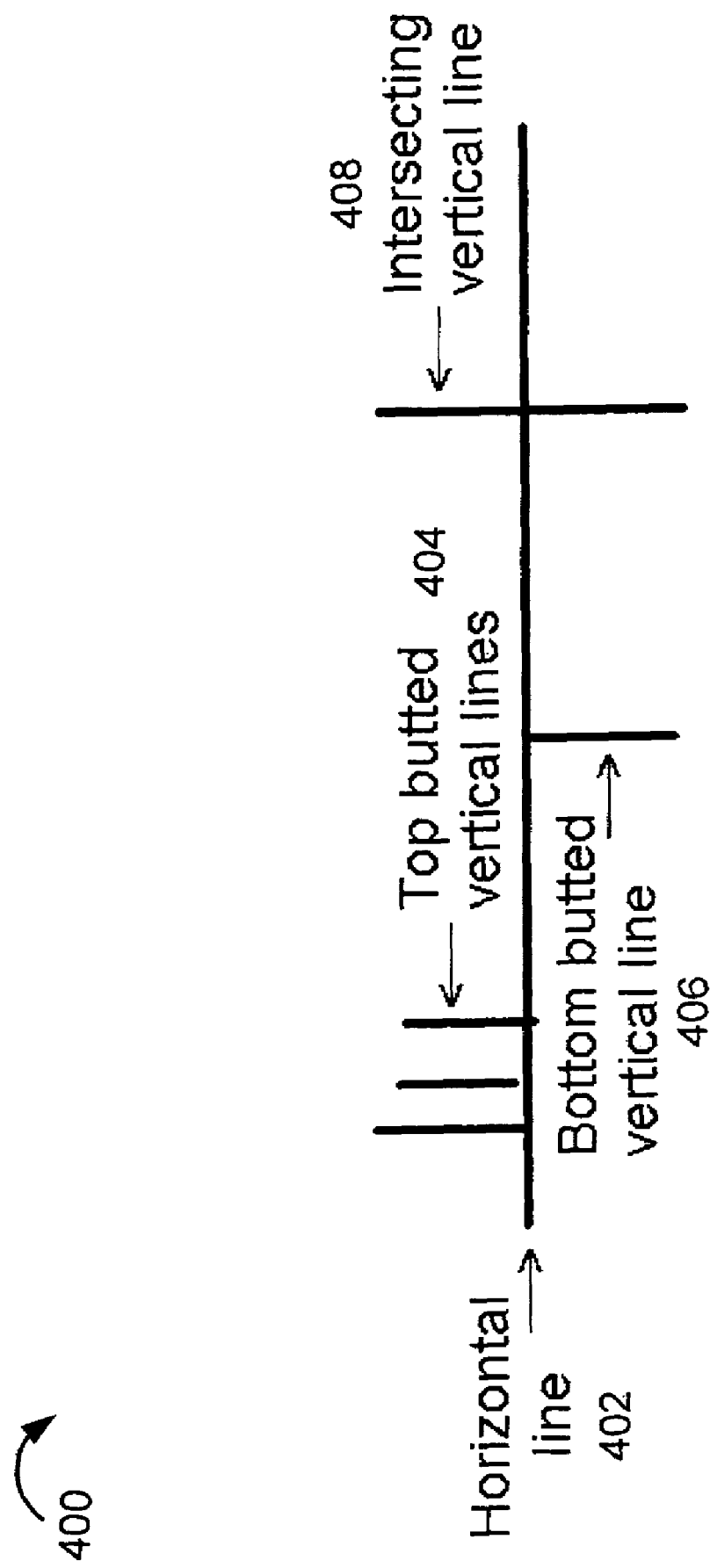
FIG. 4 illustrates various vertical lines and how they may intersect a horizontal line to facilitate an understanding of the comb analysis performed in accordance with the invention.

FIG. 4 includes a drawing 400 which illustrates various vertical lines and how they may intersect a horizontal line to facilitate an understanding of the comb analysis performed in accordance with the invention. Drawing 400 includes a horizontal line 402, top butted vertical lines 404, a bottom butted vertical line 406 and an intersecting vertical line 408.

Figure 5:
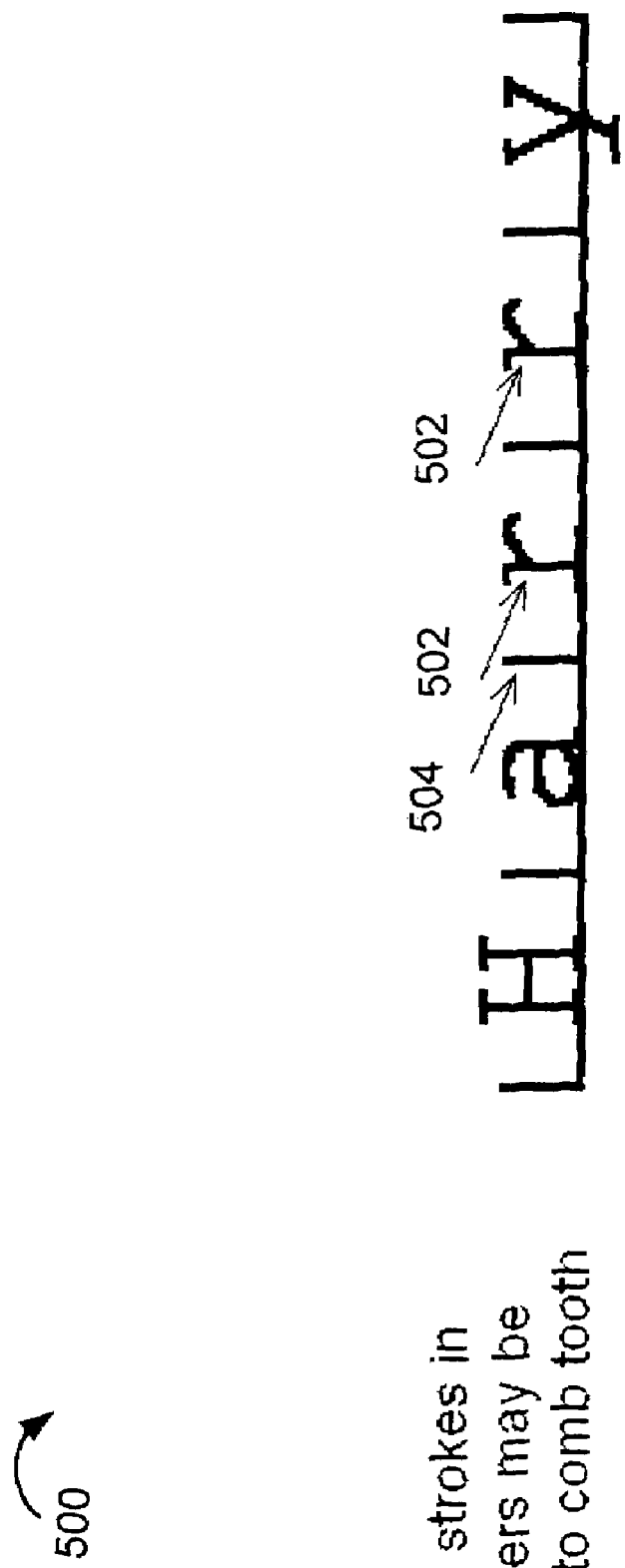
FIG. 5 is an example of a comb with entered text showing how the vertical strokes in text characters may be similar to the height of comb tooth and how text characters may include vertical lines which, depending on the entered text, may have non-uniform spacing while the comb vertical line spacing tends to be uniform.

FIG. 5 is an example of a comb with entered text 500 showing how the vertical strokes in text characters 502 may be similar to the height of comb tooth 504 and how text characters may include vertical lines which, depending on the entered text, may have non-uniform spacing while the comb vertical line spacing tends to be uniform.

Figure 6:
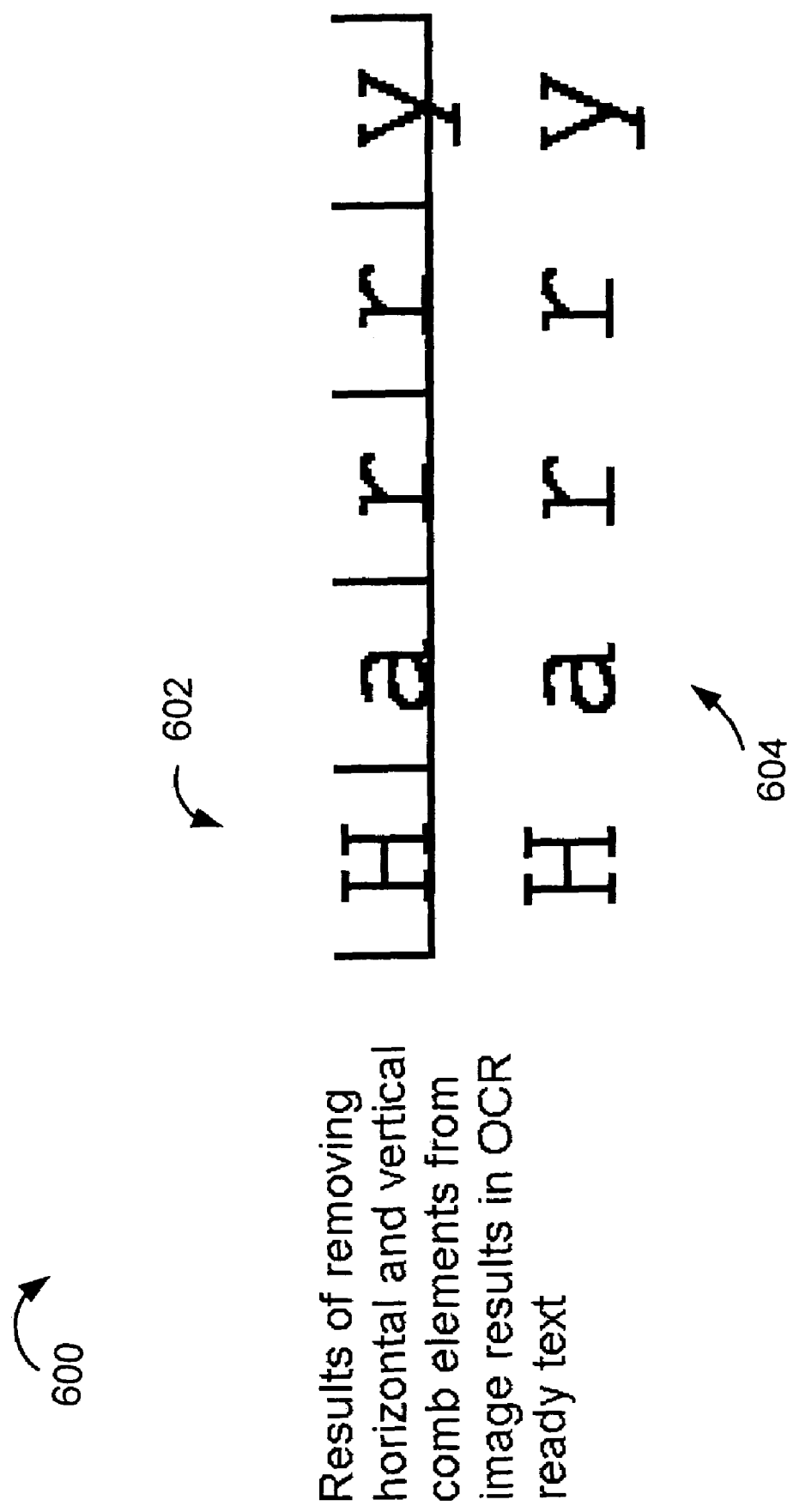
FIG. 6 depicts an image including a comb and text and the text image resulting after comb detection and removal in accordance with the invention.

FIG. 6 depicts an image 600 including a comb and text 602 and the text image 604 resulting after comb detection and removal in accordance with the invention.

Figure 7:
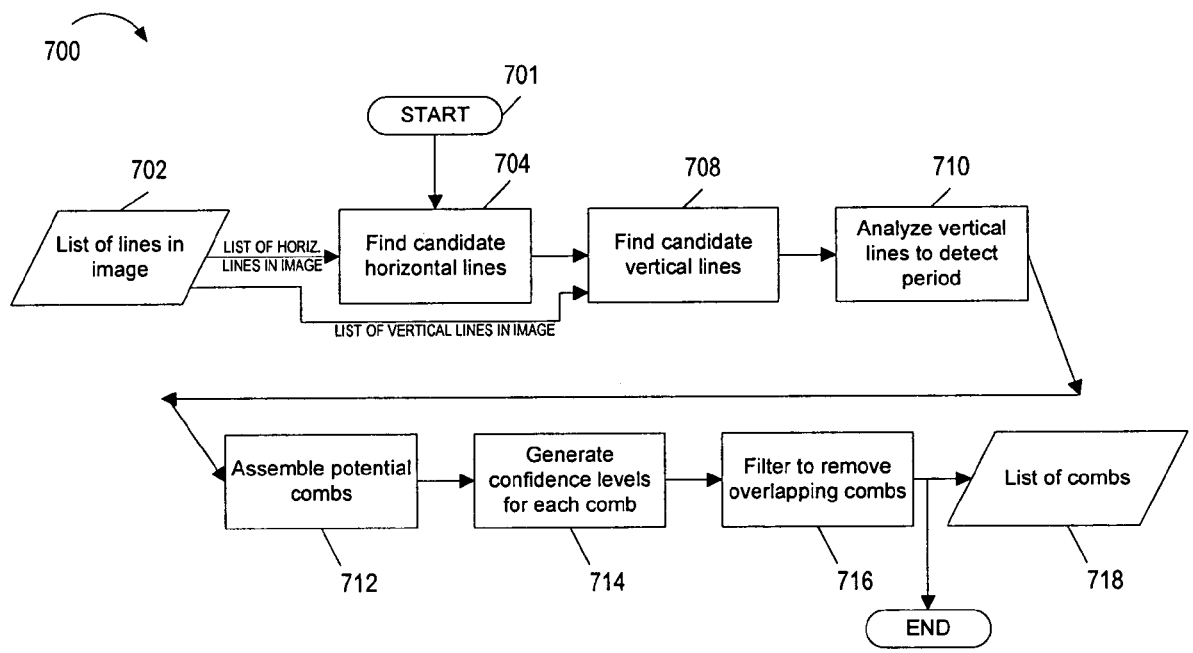
FIG. 7 depicts an exemplary method of processing an image to detect combs and generate a list of combs detected in the processed image, e.g., to support further image processing such as comb extraction.

FIG. 7 is a drawing of a flowchart 700 of an exemplary method of a comb detection process in accordance with various embodiments of the present invention. The exemplary method starts in step 701 and proceeds to step 704. The comb detection process works with lists of horizontal and vertical lines in the image 702. These lines can be generated by a line detection algorithm run on a raster image. The lines, in some embodiments are specified by an endpoint and length, or two endpoints, and thickness. Lists of lines in the image 702 includes lists of horizontal lines and lists of vertical lines, the list of horizontal lines is an input to step 704, while the list of vertical lines is an input to step 708. In step 704, candidate horizontal lines are determined from the input set of horizontal lines. In step 704, the list of horizontal lines is filtered to remove lines that are too short or too thick to be part of a comb. Operation proceeds from step 704 to step 708. In step 708 each vertical line is associated with a candidate horizontal line it touches, and vertical lines that do not touch a candidate horizontal line are rejected. Operation proceeds from step 708 to step 710. In step 710, the remaining vertical lines are analyzed to determine the most common horizontal spacings between lines along a given horizontal line based on an expected range of possible spacings. Operation proceeds from step 710 to step 712. In step 712, the spacings found in step 710 are used to find periodically spaced vertical lines along each horizontal. These sets of periodic lines are the potential combs. Operation proceeds from step 712 to step 714. In step 714, each comb is assigned a confidence level based on size, tooth count, and regularity of tooth height. Operation proceeds from step 714 to step 716. In step 716, filtering is performed to remove overlapping combs, e.g., the combs are compared, and overlapping combs are resolved. The resulting list of combs 718 obtained as output from step 716 can be, and sometime is, used to remove those lines from the original image, leaving the fill text, which can then be passed to a digital character recognition process.

Figure 8:
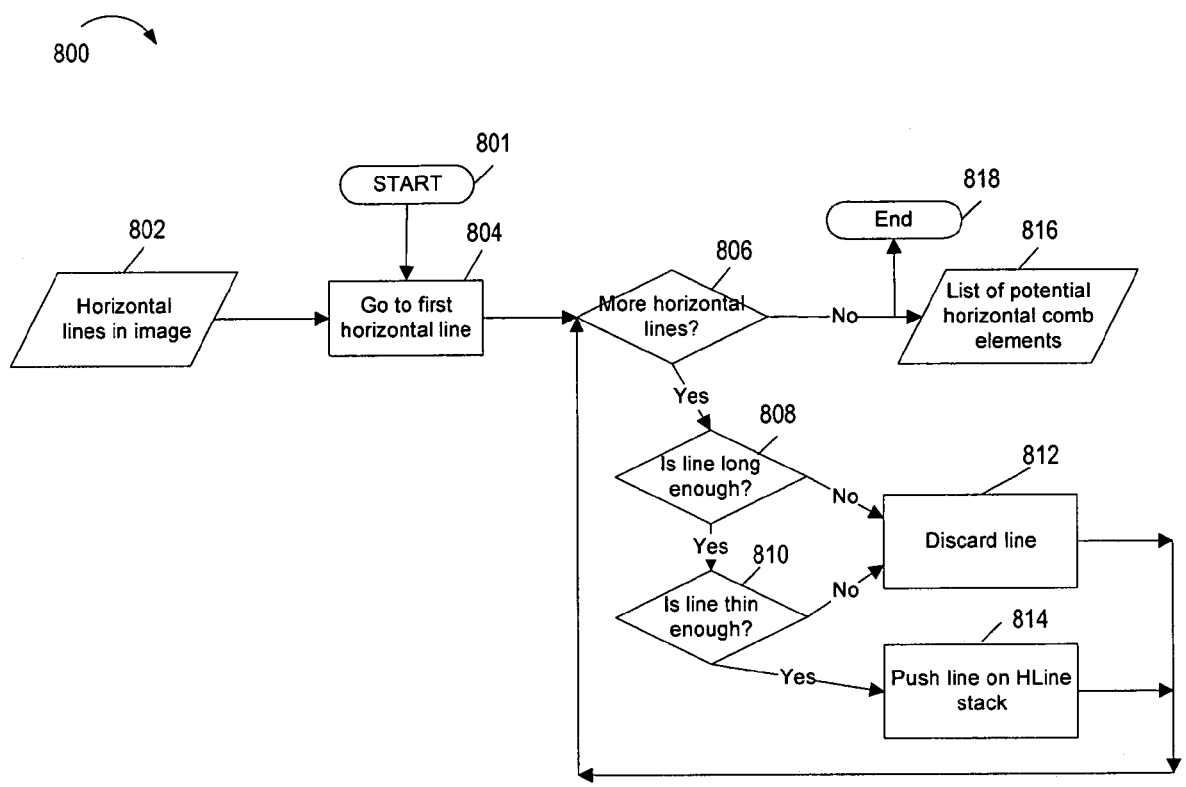
FIG. 8 depicts a horizontal line detection method that may be used to generate a list of lines of horizontal lines as part of the find candidate horizontal lines step of the method of FIG. 7.

FIG. 8 is a drawing of a flowchart 800 of an exemplary horizontal line detection process in accordance with the present invention. Exemplary flowchart 800, is in some embodiments, used to implement step 704 of the method of FIG. 7. The exemplary method starts in step 801 and proceeds to step 804. The horizontal line detection process uses the list of horizontal lines in the image 802 as input and goes to the first horizontal line in step 804. The process iterates through each horizontal line of the list of horizontal lines via decision step 806. Lines that are determined to be too short in step 808 or determined to be too thick in step 810 are discarded in step 812 and the remaining lines are placed in the horizontal line vector in step 814. The resulting list 816 forms the basis for assembling potential combs.

In other words, operation proceeds as described below. Operation proceeds from step 804 to step 806. In step 806, operation proceeds differently as a function of whether or not there are more horizontal lines to be evaluated. If there are no more horizontal lines to be evaluated, then operation proceeds from step 806 to end step 818 and the list of potential horizontal comb elements 816, e.g., information corresponding to information obtained from any iterations of step 814, is an output. If there are more horizontal lines to be evaluated, then operation proceeds from step 806 to step 808, where a determination is made as to whether the line is long enough. If the line is determined to be long enough operation proceeds from step 808 to step 810; if the line is determined not to be long enough, then operation proceeds from step 808 to step 812. In step 810, a determination is made as to whether or not the line being evaluated is thin enough. If the line is determined in step 810 to be thin enough, then operation proceeds from step 810 to step 814; otherwise operation proceeds from step 810 to step 812.

In step 812, the line, having failed to meet at least one of the selection criteria of steps 808 and 810, is discarded. In step 814, the line having satisfied the criteria of both steps 808 and step 810, is pushed on a horizontal line stack. Operation proceeds from either step 812 or step 814 to step 806, where a determination is made as to whether or not more horizontal lines are to be evaluated.

Figure 9:
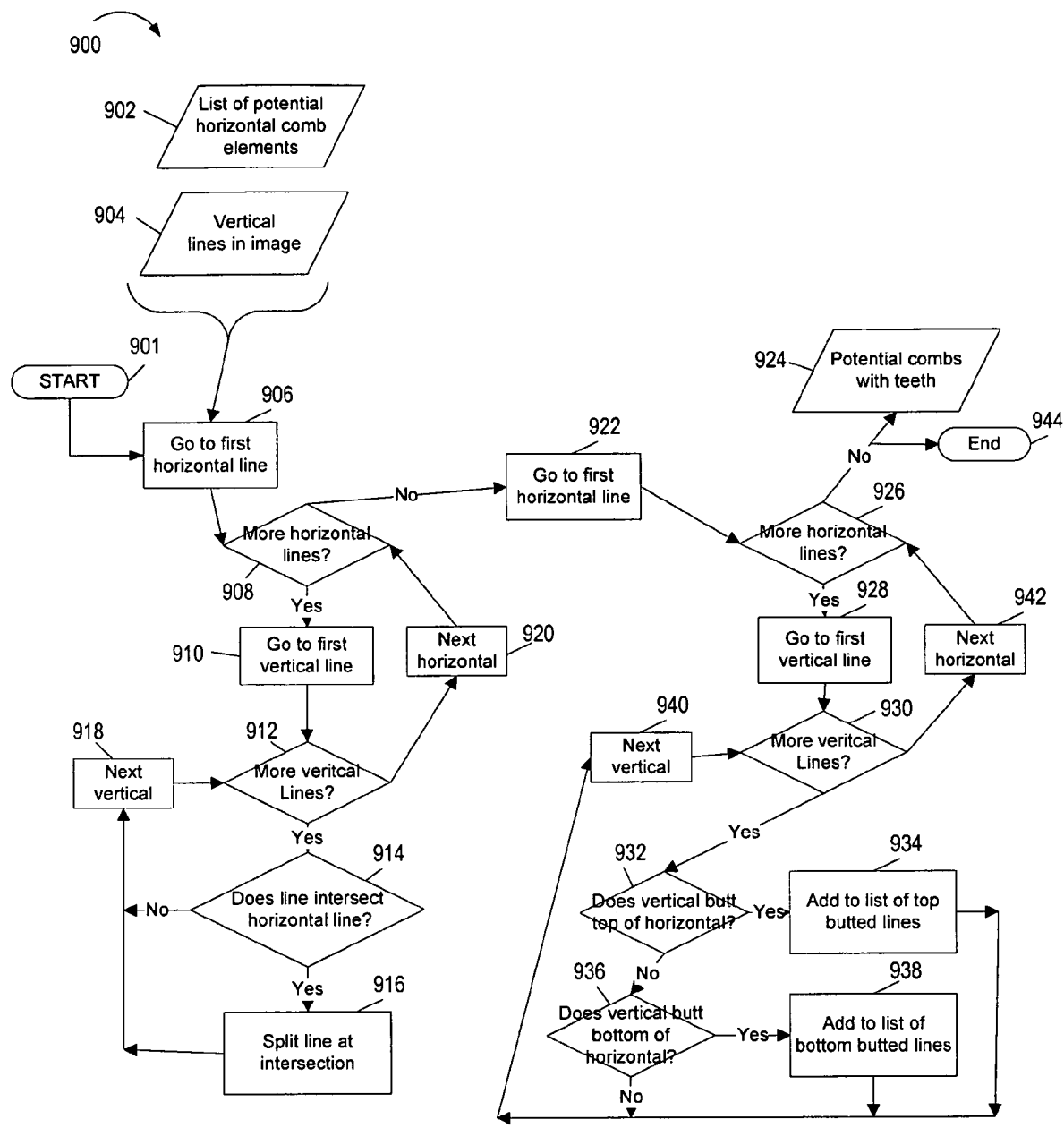
FIG. 9 depicts an exemplary method of finding vertical lines which may be part of combs and which can be used to implement the find candidate vertical lines step of the method of FIG. 7.

FIG. 9 is a drawing of a flowchart 900 of an exemplary vertical line filtering process which associates the vertical lines with horizontal lines they intersect. Vertical line filtering flowchart 900 is, in some embodiments, used to implement step 708 of FIG. 7. Operation starts in step 901 and proceeds to step 906. List of potential horizontal comb elements 902 and vertical lines in image are inputs. Each vertical line is compared to horizontal lines in the image (see steps 906, 908, 920, 910, 912, 918). Any vertical lines determined in step 914 to cross a horizontal line is split at the crossing in step 916 to produce a potential comb tooth. The additional vertical lines are put at the end of the vertical line vector. The vector of potential teeth are then split into separate lists, based on the horizontal lines they touch. Each horizontal line is compared against the vertical lines (see steps 922, 926, 942, 928, 930, 940). Verticals that are determined in step 932 to butt up to a horizontal from the top are added to the list of top butted lines for that horizontal in step 934 while lines that are determined in step 936 to butt to the bottom are added to the list of bottom butted lines for that horizontal in step 938.

In other words, operation proceeds as described below. Operation starts in step 901 and proceeds to step 906, in which the first horizontal line from the list of potential horizontal comb elements 902 is identified. Operation proceeds from step 906 to step 908. In step 908, operation proceeds as a function of whether or not there are horizontal lines from the list of horizontal comb elements 902 to be processed. If there are no more horizontal lines to be processed, operation proceeds to step 922 otherwise operation proceeds to step 910. In step 910 the first vertical line from the vertical lines in image 904 is identified. Operation proceeds from step 910 to step 912. In step 912, operation proceeds as a function as to whether there are any vertical lines from set 904 to still be processed. If there are no more vertical lines, then operation proceeds from step 912 to step 920, where the next horizontal line in the list 902 is identified. Operation proceeds from step 920 to step 908.

Returning to step 912, in step 912 if there are remaining vertical lines to be processed, operation proceeds to step 914. In step 914, a determination is made as to whether or not the vertical line under consideration intersects the horizontal line under consideration. If it is determined in step 914, that there is an intersection, then operation proceeds to step 916, where the vertical line is split at the intersection. Operation proceeds from step 916 to step 918. If it is determined in step 914 that the vertical line under consideration does not intersect the horizontal line under consideration, then operation proceeds to step 918. In step 918, the next vertical line in the set 904 is identified. Operation proceeds from step 918 to step 912.

In step 908, if it is determined that the first set of processing (steps 906, 908, 910, 920, 912, 914, 916, 918) pertaining to the list of horizontal lines 902 has completed, operation proceeds to step 922, where a second set of processing is started and the first horizontal line in set 902 is identified. Operation proceeds from step 922 to step 926, where it is determined as to whether or not there are horizontal lines to be considered. If it is determined in step 926 that there are not more horizontal lines to be considered identified potential combs with teeth 924 is output and operation proceeds to end step 944. Potential combs with teeth 924 represents information corresponding to lists created via steps 934 and/or 938, e.g., a potential comb being a combination of a horizontal comb line and a set of associated vertical line extending above the line or a horizontal comb line and a set of associated vertical lines extending below the horizontal line.

In step 926, if it is determined that more horizontal lines are still to be considered, operation proceeds to step 928, where the first vertical line to be considered is identified. Note that vertical lines used for consideration has been updated from the vertical lines in image 904 by the additional of lines resulting from split line operations of step 916. Operation proceeds from step 928 to step 930. In step 930, operation proceeds depending upon whether or not vertical lines remain to be considered. If there are no more vertical lines to be considered, then operation proceeds to step 942, where the next horizontal line from list 902 is identified. Operation proceeds from step 942 to step 926.

In step 930 if there are more vertical lines to be considered, then operation proceeds from step 930 to step 932. In step 932, it is determined whether the vertical line under consideration butts the top of the horizontal line under consideration. If it is determined in step 932 that the vertical line does butt the top of the horizontal line, then operation proceeds to step 934, where that vertical line is added to a list of top butted lines, e.g., a list of top butted lines associated with the horizontal line under consideration; otherwise operation proceeds to step 936. In step 936, it is determined whether or not the vertical line under consideration butts the bottom of the horizontal line under consideration. If it is determined in step 936, that the vertical line does butt the bottom of the horizontal line under consideration, then operation proceeds to step 938, otherwise operation proceeds from step 936 to step 940. In step 938 the vertical line is added to a list of bottom butted lines, e.g., a list of bottom butted lines associated with the particular horizontal line under consideration. Operation proceeds from step 934 or step 938 to step 940. In step 940, the next vertical line to be considered is identified, if there are any remaining vertical lines to be considered. Operation proceeds from step 940 to step 930.

Figure 10:
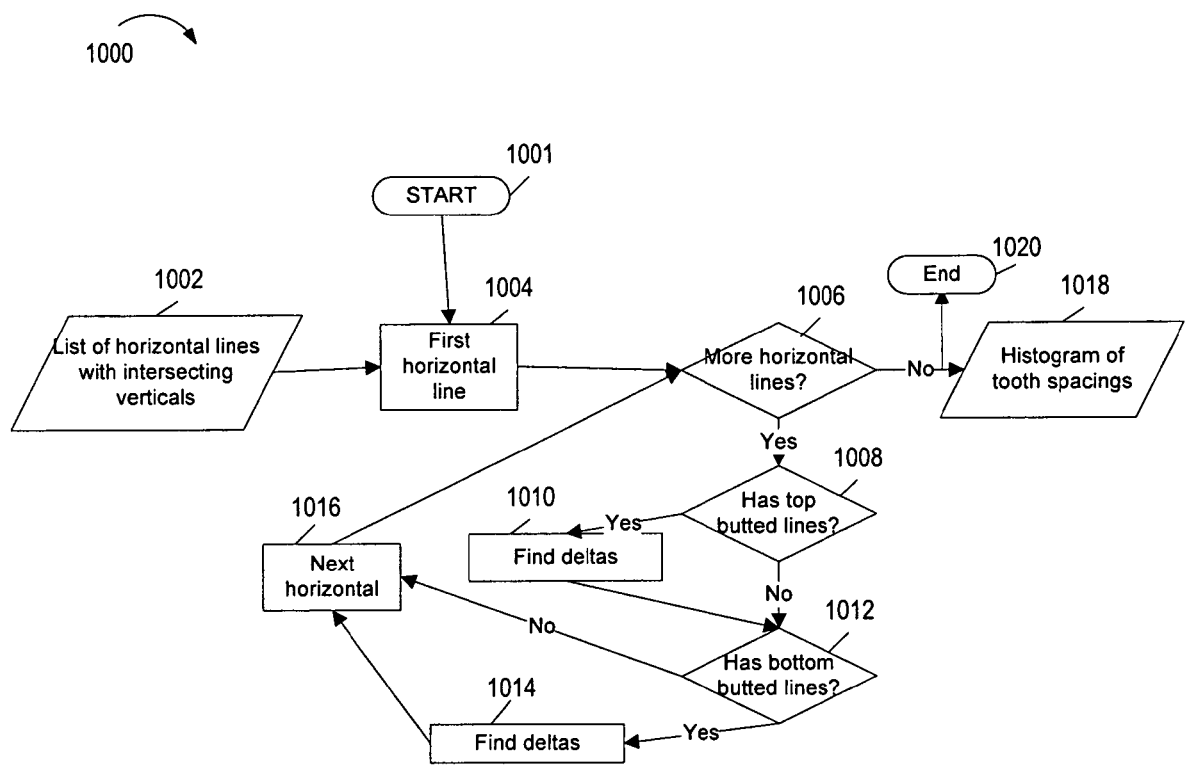
FIG. 10 depicts an exemplary method of calculating potential comb tooth spacing which may be used in implementing the step of analyzing vertical lines to detect their period of FIG. 7.

FIG. 10 is a drawing of a flowchart 1000 of an exemplary method of tooth spacing analysis. Exemplary flowchart 1000 of FIG. 10 may be used to implement a portion of step 710 of FIG. 7. The exemplary method starts in step 1001 and proceeds to step 1004. The method in flowchart 1000 analyzes the list of top and bottom butted lines for the horizontal lines. Operation starts in step 1001 and proceeds to step 1004. Steps 1004, 1006, and 1016 cause the analysis to loop through the set of horizontal lines with intersecting verticals 1002. Top butted lines go through the spacing analysis of step 1010 separately from bottom butted lines which go through the spacing analysis of step 1014. Each horizontal line to be considered is examined. If the horizontal line has top butted lines, as determined in step 1008, then deltas are calculated for the top butted lines in step 1010, and if the horizontal line under consideration has bottom butted lines as determined in step 1012 then the deltas are calculated for the bottom butted lines in step 1014. The result of the analysis of flowchart 1000 is a histogram including distance information about the distance between the vertical lines that butt to the same side of a horizontal line. When it is determined in step 1006, that there are no more horizontal lines to be considered, operation proceeds to end step 1020 and histogram information 1018 is output. The output is a histogram 1018 containing possible tooth spacings.

Figure 11:
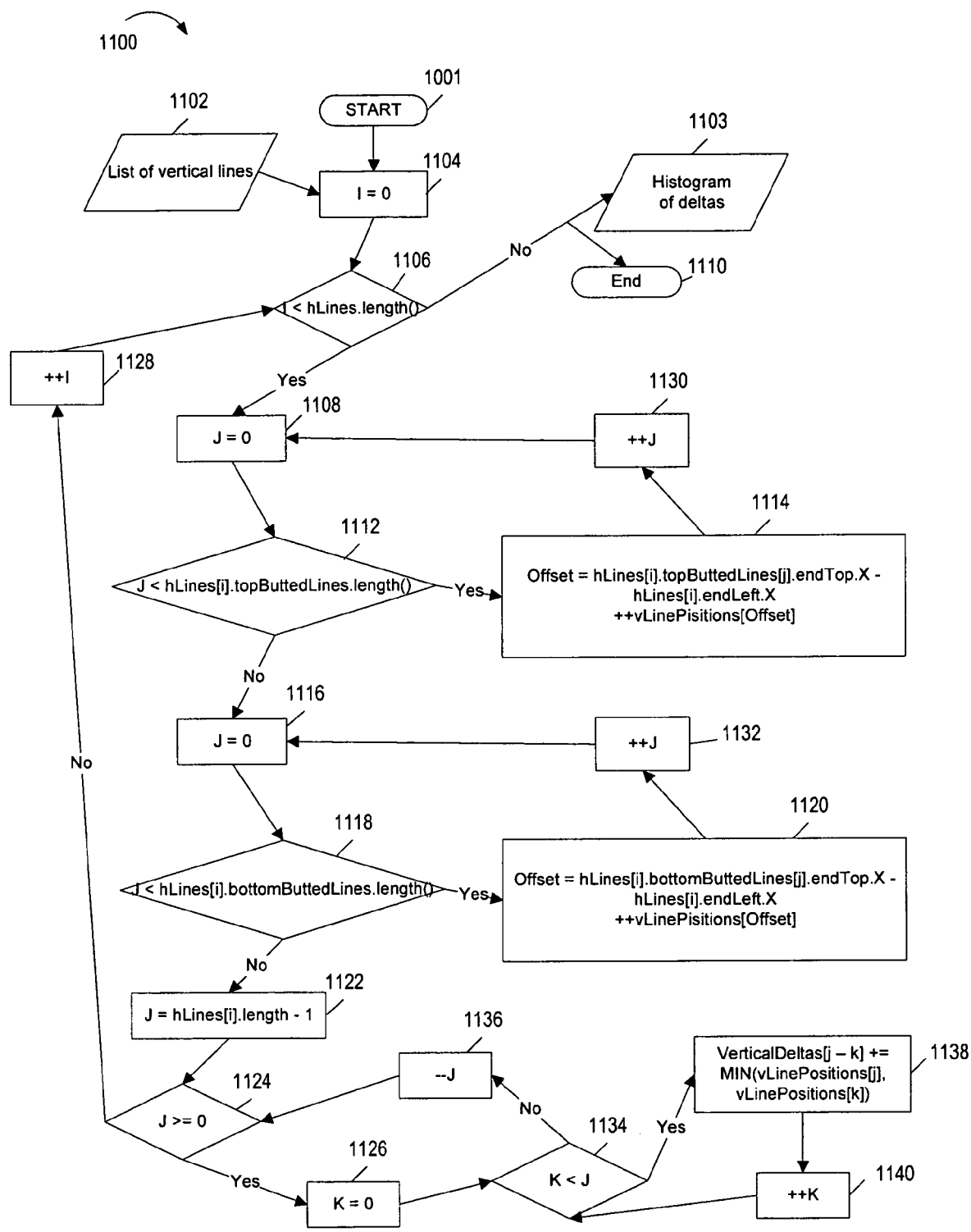
FIG. 11 is a drawing of a flowchart of an exemplary method of generating a histogram of deltas between vertical lines in accordance with the present invention.

FIG. 11 is a flowchart 1100 of an exemplary method of generating deltas for vertical lines. Flowchart 1100 is, in some embodiments, used to implement find deltas step 1010 and find delta step 1014 of FIG. 10. The method of flowchart 1100 examines the vertical lines along each horizontal line. List of vertical lines 1102 is an input to flowchart 1100 while histogram of deltas 1103 is an output.

FIG. 11 is a drawing of a flowchart 1100 of an exemplary method of generating a histogram of deltas between vertical lines in accordance with the present invention. The method iterates through the list of horizontal lines (steps 1101, 1104, 1106, 1128) to examine each vertical that butts a horizontal. Each top butted line (steps 1108, 1112, 1130) is compared to the origin of the horizontal line to determine its relative X coordinate, which is then added to the histogram of vertical line positions (step 1114). Each bottom butted line (steps 1116, 1118, 1132) is compared to the origin of the horizontal line to determine its relative X coordinate, which is then added to the histogram of vertical line positions (step 1120). Once the list of X coordinates is computed, each of the possible deltas are calculated. A nested loop with two counters is used, the outer counter at the largest offset, the line length (step 1122), and the inner counter starting at the smallest offset, zero (step 1136). The inner counter iterates up to the value of the larger counter (steps 1134, 1140) wile the outer counter iterates down to zero (steps 1124, 1136). At each iteration through the inner loop, the minimum number of lines at each offset represent the number of lines whose spacing is the difference between the inner and outer counters (step 1138).

Figure 12:
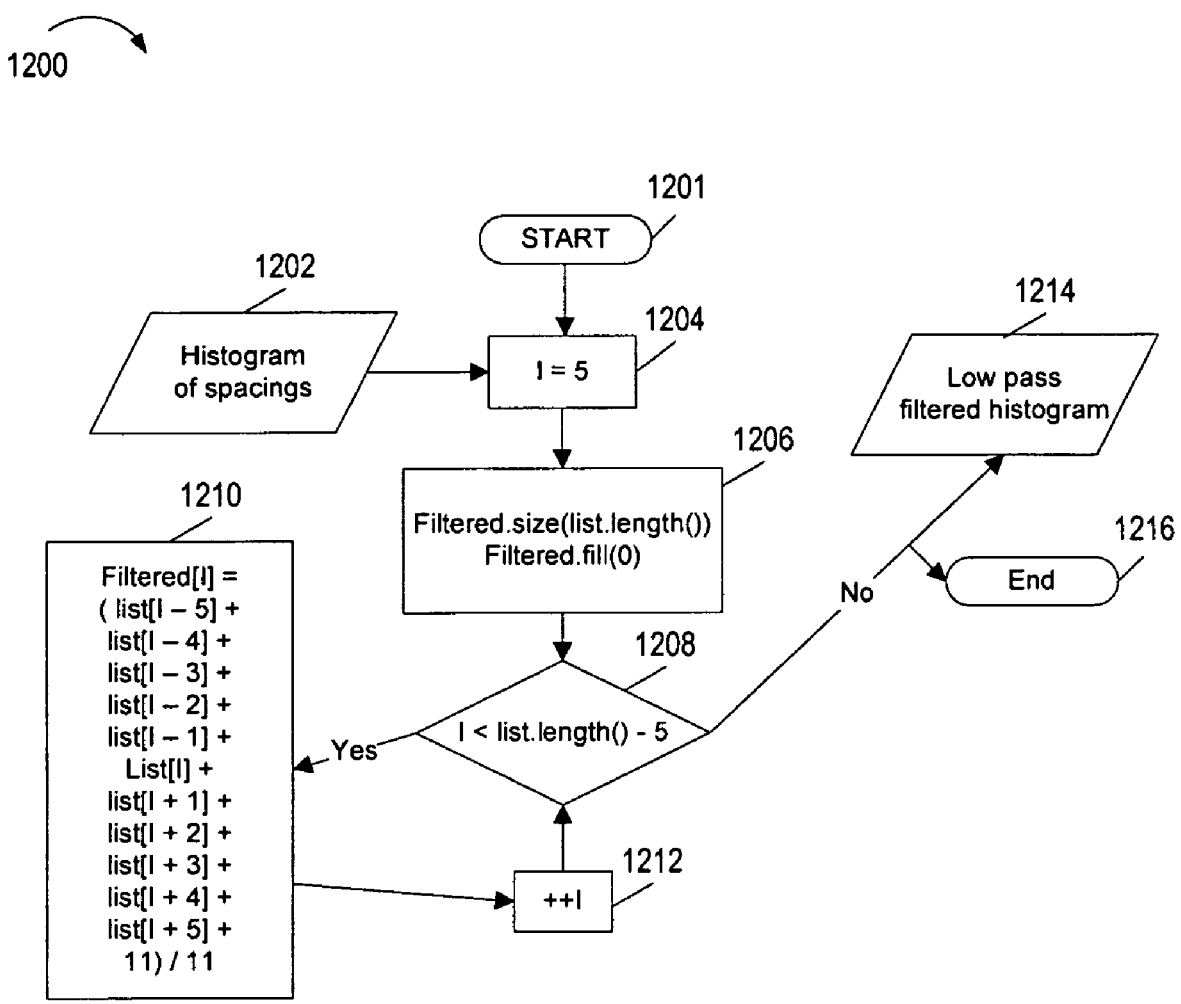
FIG. 12 depicts an exemplary method of determining parameter values by interpolating values from a given list in accordance with the present invention.

FIG. 12 is a drawing of a flowchart 1200 of an exemplary method of low pass filtering a histogram in accordance with the present invention. Flowchart 1200 may be used to implement a portion of step 710 of FIG. 7. Histogram of spacing 1202, the input to flowchart 1200, may be histogram of tooth spacings 1018 of FIG. 10. To find common spacings, the histogram of spacings 1202 (1302 of FIG. 13) is compared to a low pass filtered version 1214 (1304 of FIG. 13) in flowchart 1300 of FIG. 13. The low pass filtered version is generated by applying an 11 element wide box filter. The low pass version of the histogram is sized in step 1206 to match the spacing histogram 1202 and initialized to zero. Starting at element 5, by setting I=5 in step 1204, the low pass histogram is set in step 1210 to the average of the surrounding values in the spacings histogram, with the value floored at 1 to prevent divide by zero errors in later steps. Due to the width of the box filter, the last 5 elements are left zeroed, via steps 1208 and 1212. When the test condition of step 1208 is not satisfied, then the result, low pass filtered histogram 1214, is output and operation proceeds to end step 1216.

Figure 13:
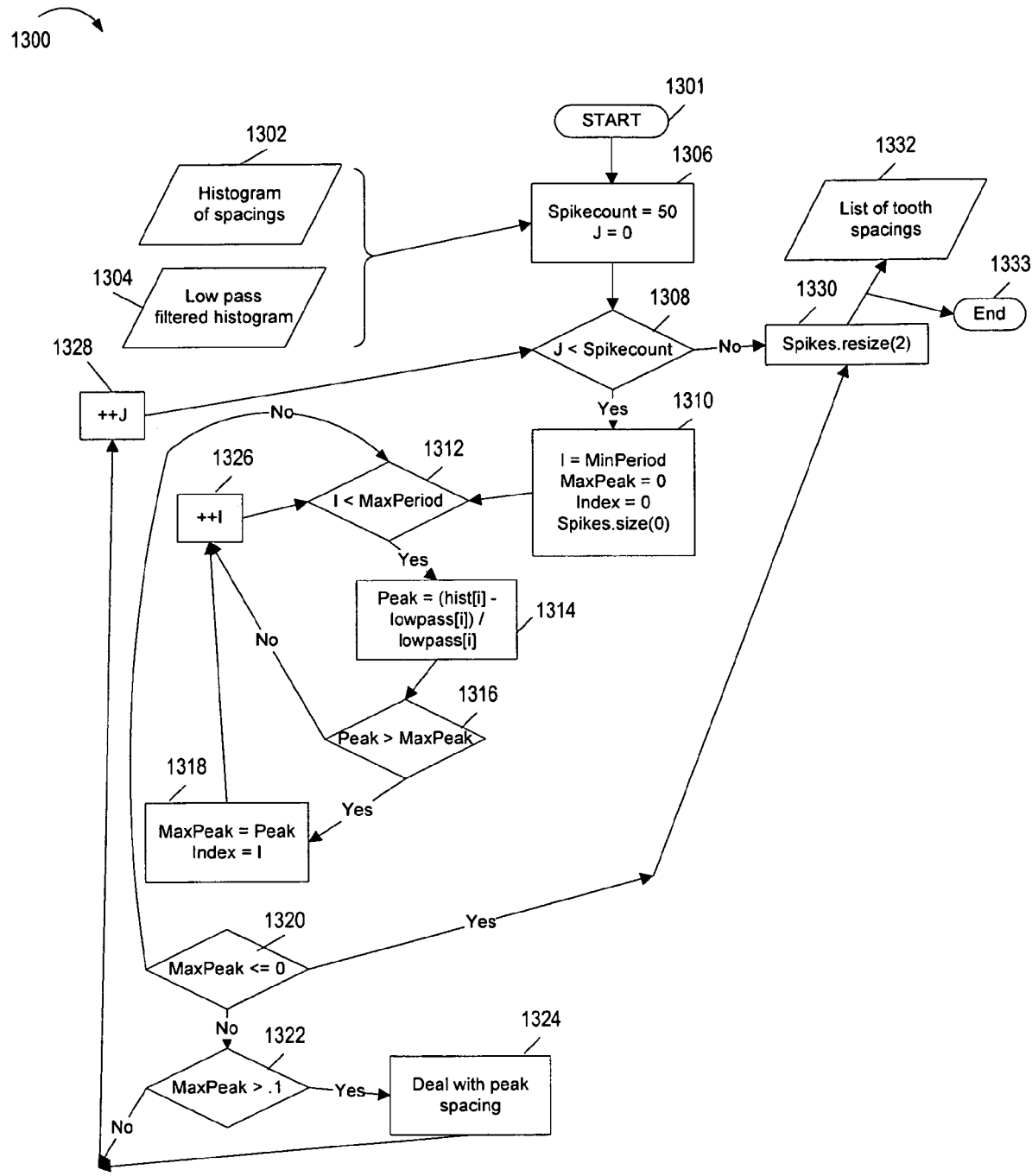
FIG. 13 depicts an exemplary method of finding peak vertical line spacings in accordance with the present invention.

The search for peak spacings in the vertical line spacing histogram of flowchart 1300 of FIG. 13 compares the histogram of the vertical line spacings 1302 to the low pass filtered version 1304. Flowchart 1300 of FIG. 13 may be used to implement a portion of step 710 of FIG. 7. Operation starts in step 1301 and proceeds to step 1306. The list of possible "spikes" is initialized to a large maximum value, e.g., 50, in step 1306. While the list is not filled, J is less than Spikecount in step 1308, the peak value and index are initialized to zero in step 1310. An index is initialized to the minimum expected tooth spacing, e.g., I=MinPeriod, in step 1310, and the histogram is searched from that point to the maximum expected tooth spacing as indicated in the conditional step 1312, where I is compared to MaxPeriod. For each spacing searched, the difference between the spacing histogram and the low pass filtered histogram is calculated in step 1314. If it is not larger than the last peak checked as performed in step 1316, then operation proceeds from step 1316 to step 1326, where I is increased to obtain the next spacing. If in step 1316 it is determined that the peak is larger than the MaxPeak, then operation proceeds from step 1316 to step 1318, where the height and index are stored, and then operation proceeds from step 1318 to step 1326.

If, after each of the elements have been examined, no peak has been recorded, as indicated by the conditional test of step 1320 being satisfied then operation proceeds to step 1330 where clean up and operation proceeds to exit 1333. However, if there is a peak as MaxPeak is determined in step 1320 to be greater than 0 operation proceeds from step 1320 to step 1322. In step 1322, a check is performed to see if the detected peak is significant. If it is determined to be significant, operation proceeds from step 1322 to step 1324, where it is determined if the detected peak needs to be inserted in the list, and it is inserted if the insertion needs to be performed. Operation then proceeds from step 1324 to step 1328, where index J is incremented. Otherwise, if the test condition of step 1322 is not satisfied operation proceeds from step 1322 to step 1328, where index J is incremented and to subsequently look for the next peak. Operation proceeds from step 1328 to step 1308. If the spike list has been filled then operation proceeds from step 1308 to step 1330, where the list is resized to contain the desired number of spacings resulting in an output list of tooth spacings 1332 and operation proceeds to exit 1333.

Figure 14:
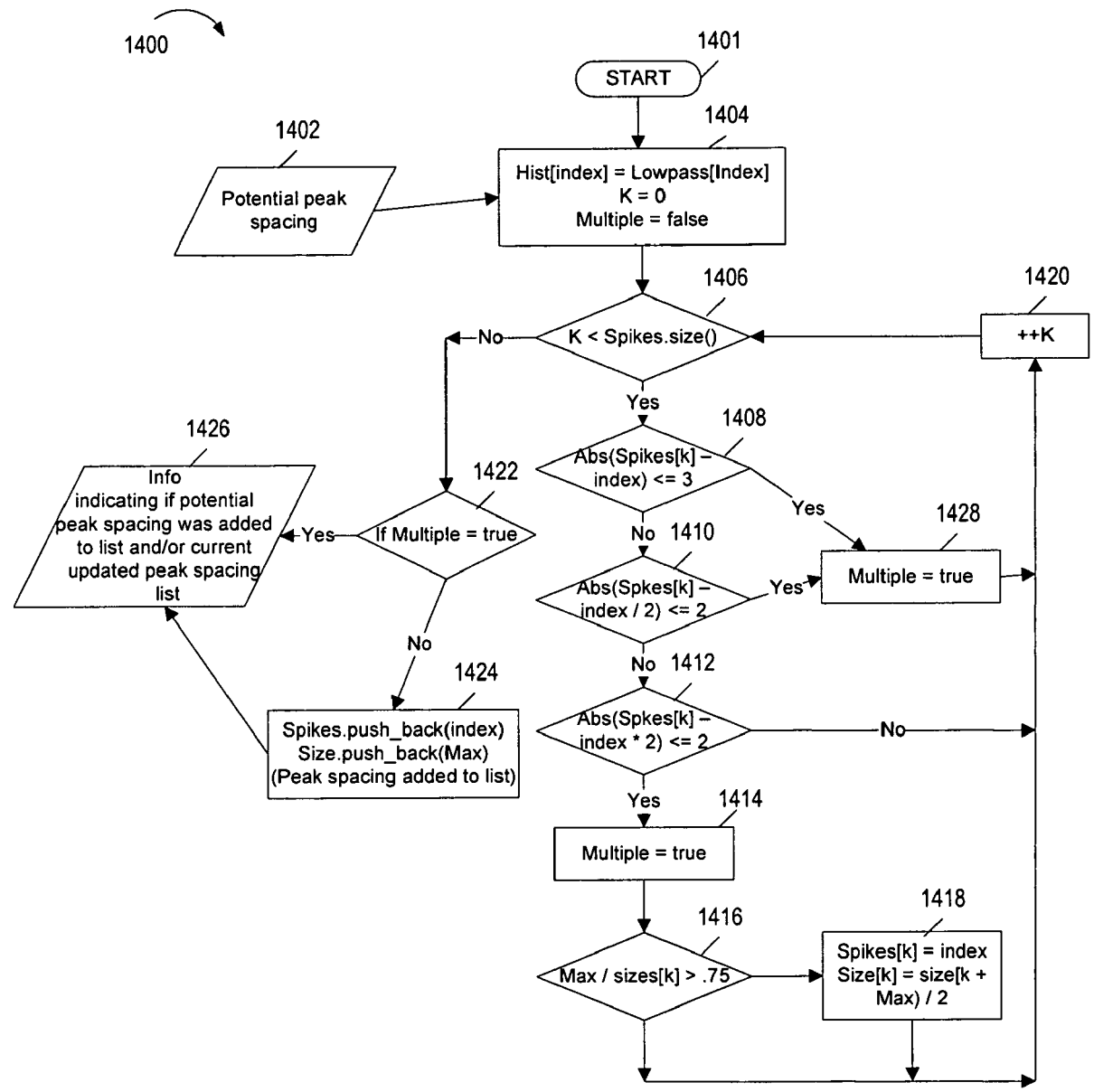
FIG. 14 depicts an exemplary method of detecting potentially redundant peak spacing information in accordance with the present invention.

FIG. 14 is a flowchart 1400 of an exemplary method of handling peaks in a spacing histogram. Flowchart 1400 of FIG. 14 is, in some embodiments, used to implement the deal with peak spacing step 1324 of FIG. 13. Operation starts in step 1401 and proceeds to step 1404. Detected peaks undergo a filtering process to help eliminate redundant spacings in the method of flowchart 1400 of FIG. 14. Potential peak spacing 1402 is an input to step 1404. Each potential peak is compared to each of the other peaks that have been detected (see input 1402, step 1404, step 1406, and step 1420). The potential peak is checked to see if it is very close to an existing peak size in step 1408. The peak is also compared to other detected peaks to eliminate "echoes", which are the result of spacings between non-adjacent comb teeth. This is checked by looking for peaks at half the current spacing in step 1410 or double the current spacing in step 1412. If any of these conditions are true, the peak is marked as a redundant peak in step 1414 or step 1428. If the potential peak is double the existing peak, then magnitudes are compared. If the wider of the two spacings has a significantly higher peak as determined in step 1416, then operation proceeds to step 1418, where the narrower is replaced with the wider. If the process finishes and the potential peak was not found to be a multiple of an already existing peak in step 1422 then the potential peak is added to the vector of existing peaks in step 1424. If the process finishes and the potential peak was found to be a multiple of an already existing peak, then the potential peak need not be added to the list. An output of flowchart 1400 is information indicating if the potential peak was added to the list and/or the current peak spacing list 1426.

Figure 15:
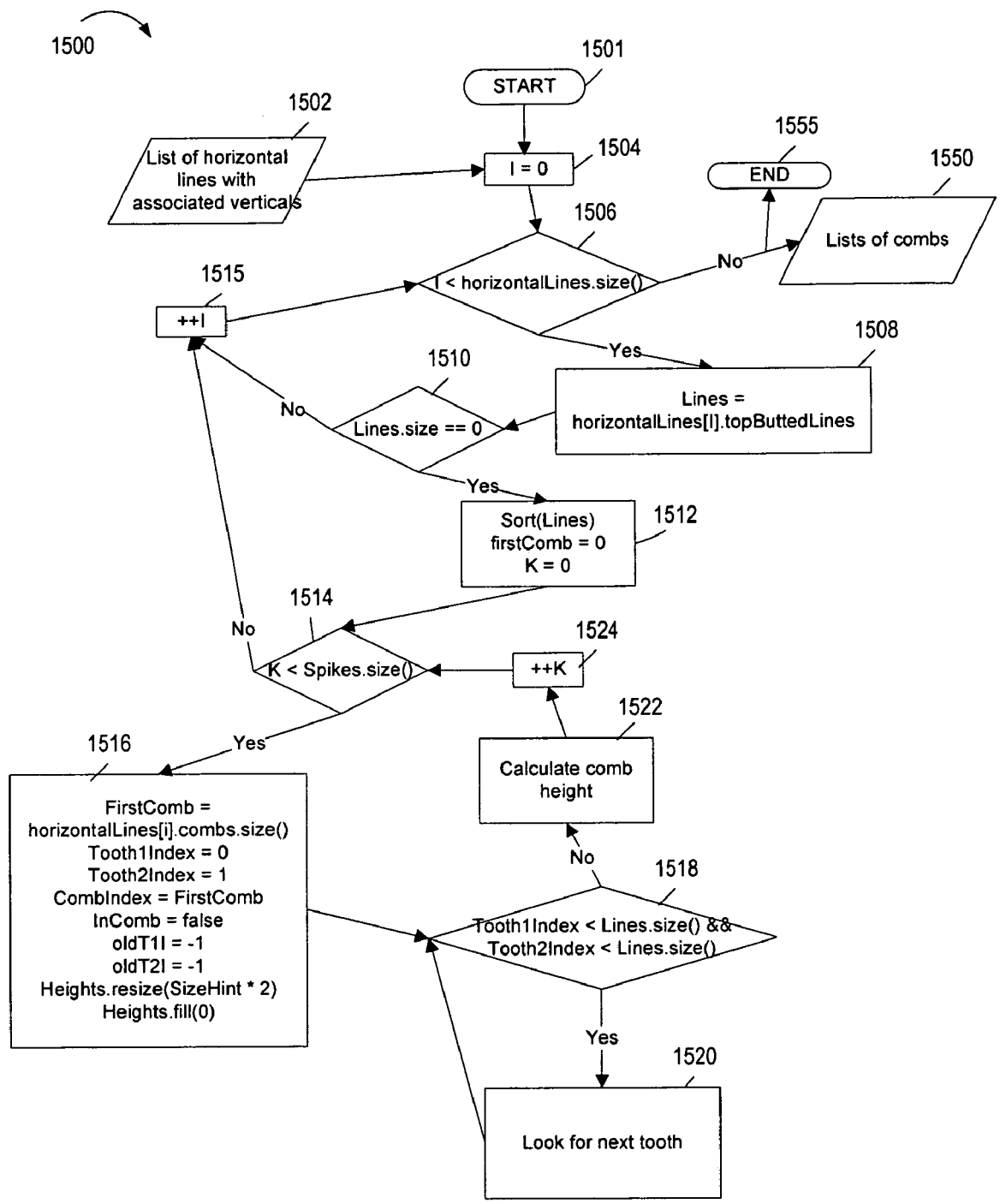
FIG. 15 depicts an exemplary method of combining vertical and horizontal lines into combs in accordance with the present invention.

Once the tooth spacings have been found, the vertical lines can be analyzed to determine the locations and sizes of combs as described in flowchart 1500 of FIG. 15, which describes an exemplary method of assembling potential combs in accordance with the present invention. In some embodiments, the flowchart of FIG. 15 is used to implement step 712 of FIG. 7. Operation starts in step 1501 and proceeds to step 1504. The list of horizontal lines with associated verticals 1502 is an input. Each comb will be composed of a horizontal line and the verticals that butt the top of that horizontal. A horizontal line with associated vertical lines from list 1502 is examined to find periodically occurring vertical lines, which will be the comb teeth. A list of tooth heights is compiled to allow statistical analysis of the teeth. Every horizontal line with top butted lines will be examined for teeth by implementing steps 1504, 1506, 1515, 1508 and 1510. The vertical lines are sorted by ascending X coordinates via step 1512, and then each potential tooth size is used in the assembling of combs (see steps 1514 and 1524). The first vertical line will be assumed to be the rightmost known tooth in a comb, the second line the potential next tooth, and the status flags will be set to their initial values (see step 1516). While there are still vertical lines in the list as determined in step 1518, operation proceeds from step 1518 to step 1520 and the spacing between the two vertical lines will be examined. When there are no more vertical lines to be considered as determined in step 1518, operation proceeds to step 1522, where the comb height is calculated.

After each of the list of horizontal lines with associated vertical has been processed, operation proceeds from step 1506 to end 1555 and the list of assembled potential combs 1550 is output.

Figure 16:
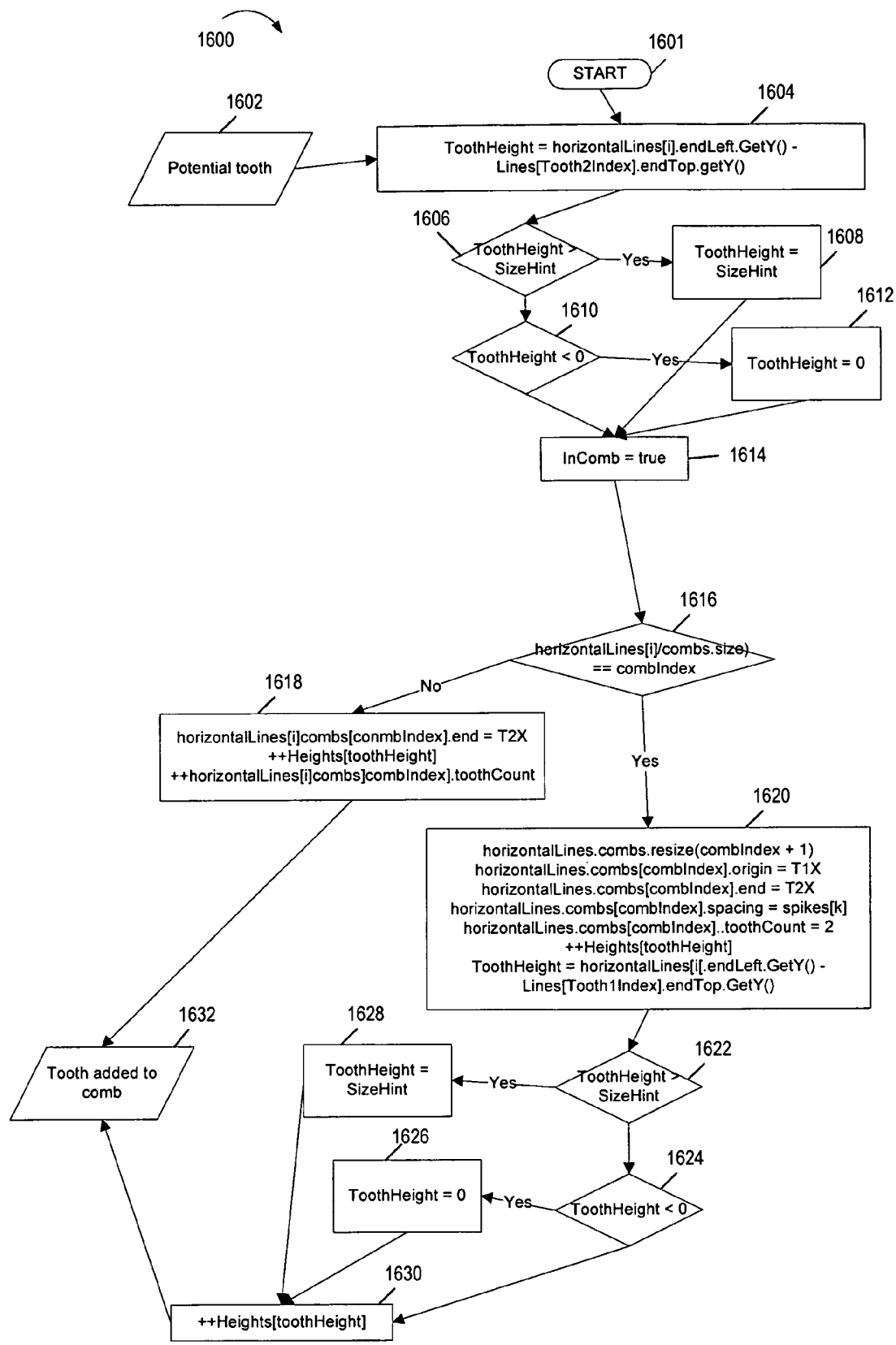
FIG. 16 depicts an exemplary method of adding a tooth to a comb structure and recording relevant information about the tooth height and location in accordance with the present invention.

FIG. 16 is a flowchart 1600 of an exemplary method of validating a potential tooth in accordance with various embodiments. Flowchart 1600 of FIG. 16 is, in some embodiments, used to implement step 2208 of flowchart 2200 of FIG. 22. Operation starts in step 1601 and proceeds to step 1604. Potential tooth information 1602 is an input to step 1604. Adding a new tooth to a comb does not require storing specific information about the vertical line, but does use the line height for statistical purposes. The height of the tooth above the horizontal is calculated in step 1604. If the tooth is too high as determined in step 1606, it is clipped to the expected height in step 1608 and to zero if needed via the determination of step 1610 and the tooth height setting operation of step 1612. The flag, InComb, is set in step 1614 to indicate that the process is in a comb. If this is the first tooth in a new comb, as determined in step 1616, then operation proceeds to step 1620. In step 1620, the left and right ends are set up based on the first two teeth and count the right tooth's height. The first tooth height is clipped to the expected height in step 1628 if the condition of step 1622 is satisfied or the first tooth height is set to zero in step 1626 if the condition of step 1624 is satisfied. If the test condition of step 1624 is not satisfied or operation proceeded to step 1628 or step 1626, then operation proceeds to step 1630 where the information is added as well. If this is not the first tooth as determined in step 1616, then operation proceeds from step 1616 to step 1618. In step 1618, the right edge is moved and the height of the new rightmost tooth is counted. From either step 1618 or step 1630 operation of flowchart 1600 ends with output information 1632. The comb now contains the needed information from the new tooth, output information 1632.

Figure 17:
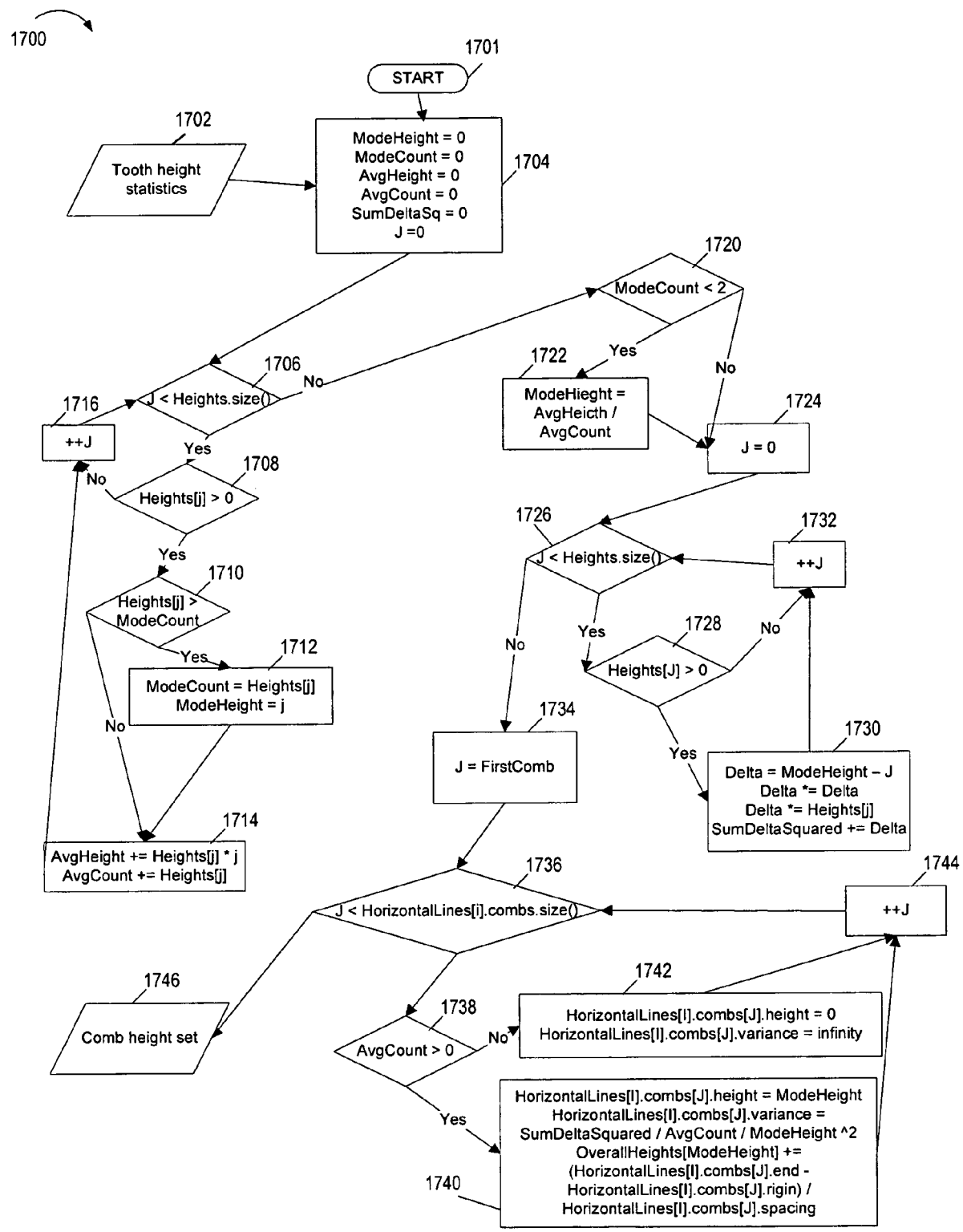
FIG. 17 depicts an exemplary method of analyzing tooth height statistics to generate height and variance data about a comb in accordance with the present invention.

FIG. 17 is a flowchart 1700 of an exemplary method of calculating a comb height in accordance with the present invention. Exemplary flowchart 1700 is, in some embodiments, used to implement step 1522 of flowchart 1500. Once the teeth have been added to a comb, a height is generated for that comb using flowchart 1700 of FIG. 17. Operation starts in step 1701 and proceeds to step 1704. Tooth height statistics information 1702, e.g., a histogram of tooth heights, is an input to step 1704. The height calculation begins with the histogram of tooth heights 1702. Counters for calculating the average, mode, and variance of the tooth heights are initialized in step 1704. The function iterates through each of the heights (step 1706, step 1716). If a height contains a non-zero count (step 1708) then it is checked against the count of the previous candidate for the mode (step 1710). If the count is higher, the height is chosen as the new candidate for the mode (step 1712). Each of the nonzero heights is added to the calculation of the average (step 1714). If the number of values in the mode height is less than 2 (step 1720) then the average is used as the mode for further calculations (step 1722). Each of the tooth heights (step 1726, step 1732) are then compared against the mode, and the sum of the squares of the differences is calculated (step 1730). The function then iterates through each of the combs on the current horizontal line (step 1734, step 1736, step 1744). If no valid statistics were generated (step 1738) then the comb is marked invalid (step 1742), otherwise the height is set to the mode, the variance is calculated, and the comb height is added to the comb height statistics (step 1740). When each of the combs on the line has been processed, the function exits (step 1746).

Figure 18:
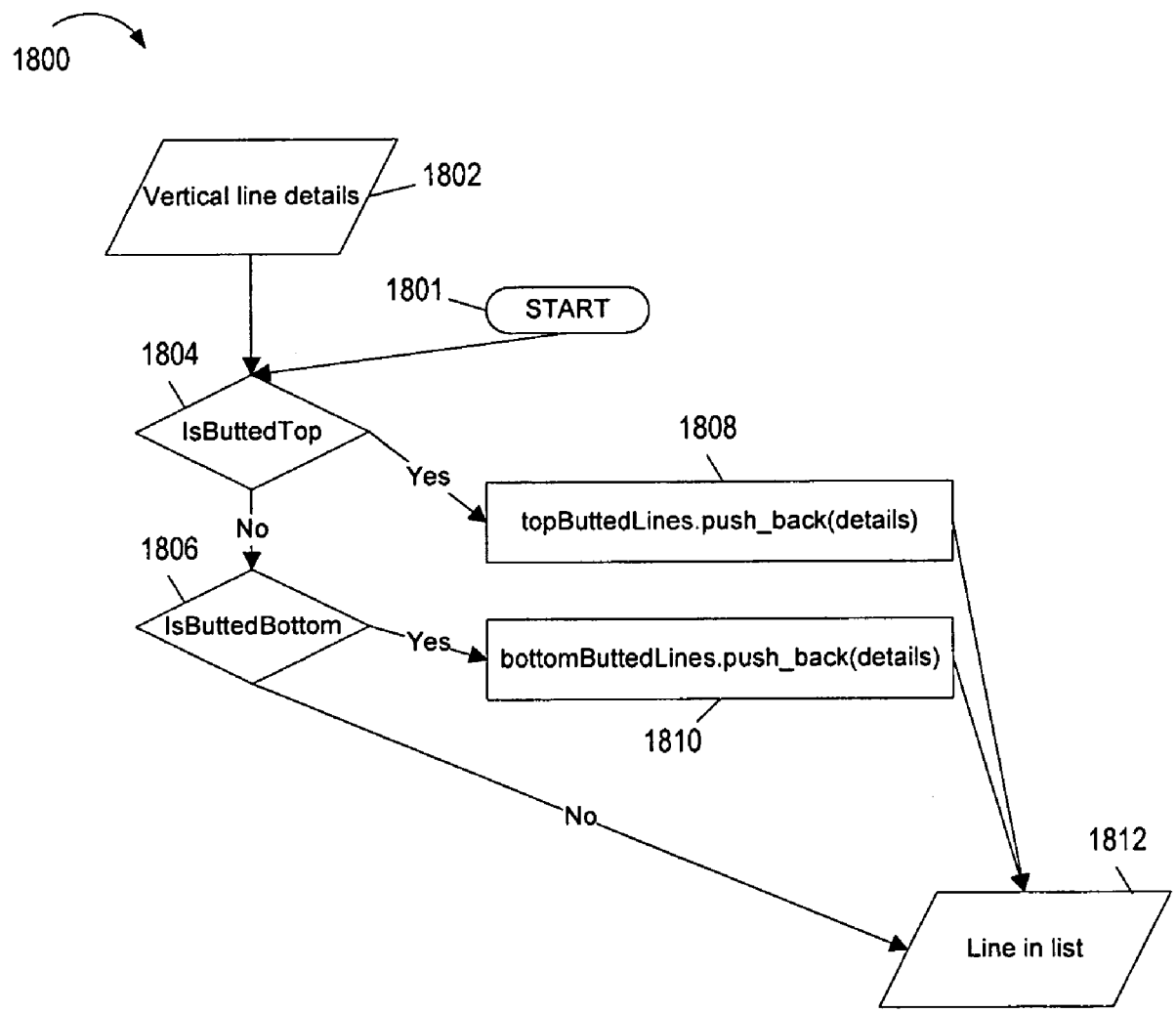
FIG. 18 depicts an exemplary method of associating a vertical line with a horizontal line as a top or bottom butted line in accordance with the present invention.

FIG. 18 depicts a flowchart 1800 of an exemplary method of associating a vertical line with a horizontal line as a top or bottom butted line in accordance with the present invention. Flowchart 1800 of FIG. 18 is, in some embodiments, used as an alternative to steps 932, 934, 936, and 938 of FIG. 9. Operation starts in step 1801 and proceeds to step 1804. Vertical line details information 1802 is an input to step 1804. Associating a vertical line with a horizontal via flowchart 1800 of FIG. 18 results in the vertical line being added to a list of butted lines, if appropriate (output line in list information 1812). If the bottom endpoint of the vertical line falls close to the horizontal line as determined in step 1804 then it is added to the list of top butted lines for that horizontal in step 1808. If the top endpoint of the vertical line falls close to the horizontal line as determined in step 1806 then it is added to the list of bottom butted lines in step 1810.

Figure 19:
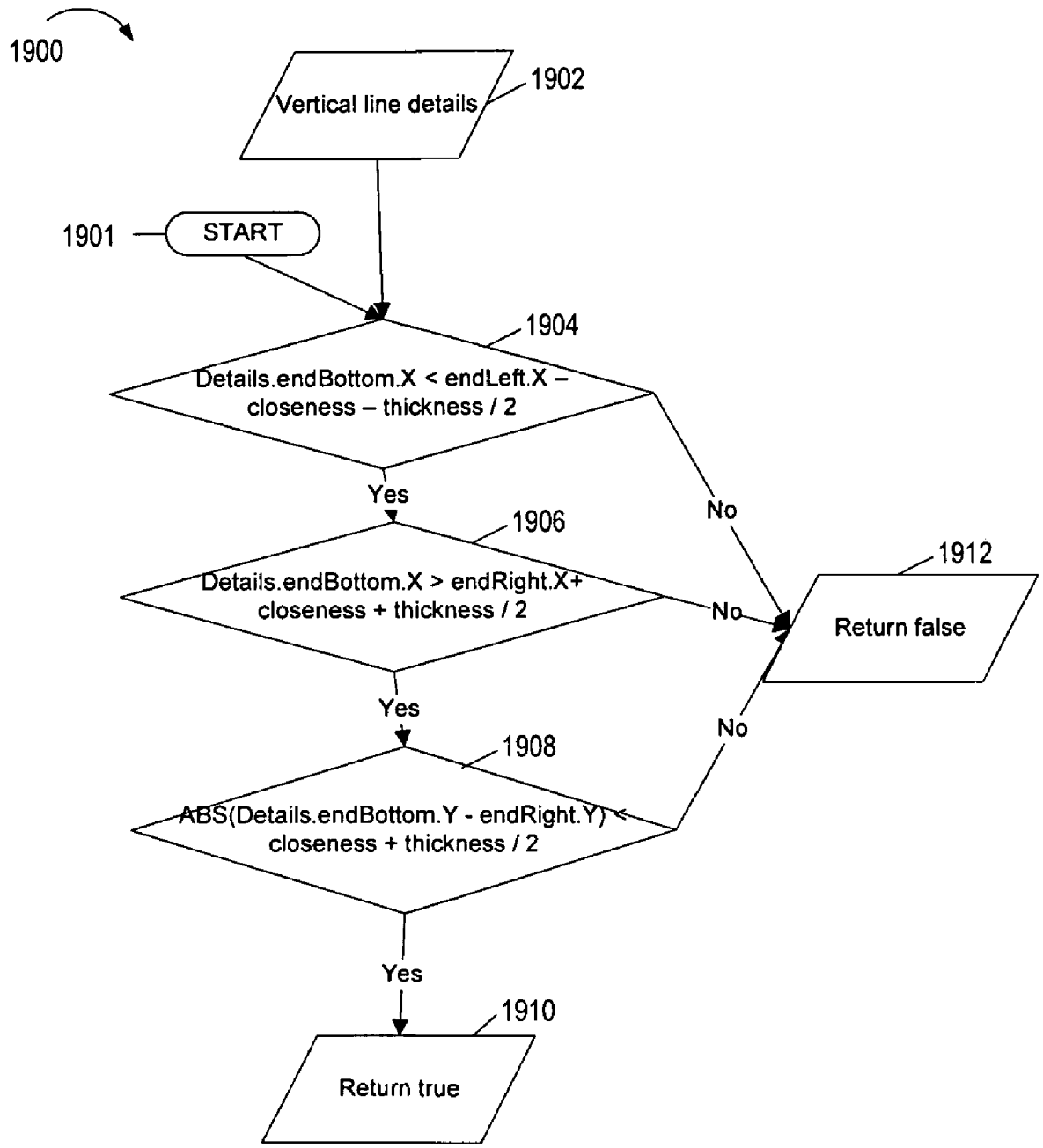
FIG. 19 depicts an exemplary method of detecting if a vertical line butts a horizontal line on the top in accordance with the present invention.

FIG. 19 depicts a flowchart 1900 of an exemplary method of detecting if a vertical line butts a horizontal line on the top in accordance with the present invention. Exemplary flowchart 1900 is used in some embodiments to implement one or more of step 932 of FIG. 9 and step 1804 of FIG. 18. Operation starts in step 1901 and proceeds to step 1904. Vertical line details information 1902 is an input to step 1904. To check to see if a vertical line butts to the top of a horizontal line using the method of flowchart 1900 of FIG. 19 the vertical line coordinates included in information 1902 are compared to the horizontal line. If the vertical is too far left of the horizontal as indicated by a no condition from the check of step 1904 or too far to the right of the horizontal as indicated by a no condition from the check of step 1906, or if the bottom of the vertical is not close to the horizontal line as indicated by a no condition from the check of step 1908 then the function of flowchart 1900 returns a false in output 1912. If none of these conditions are true, then it returns true 1910.

Figure 20:
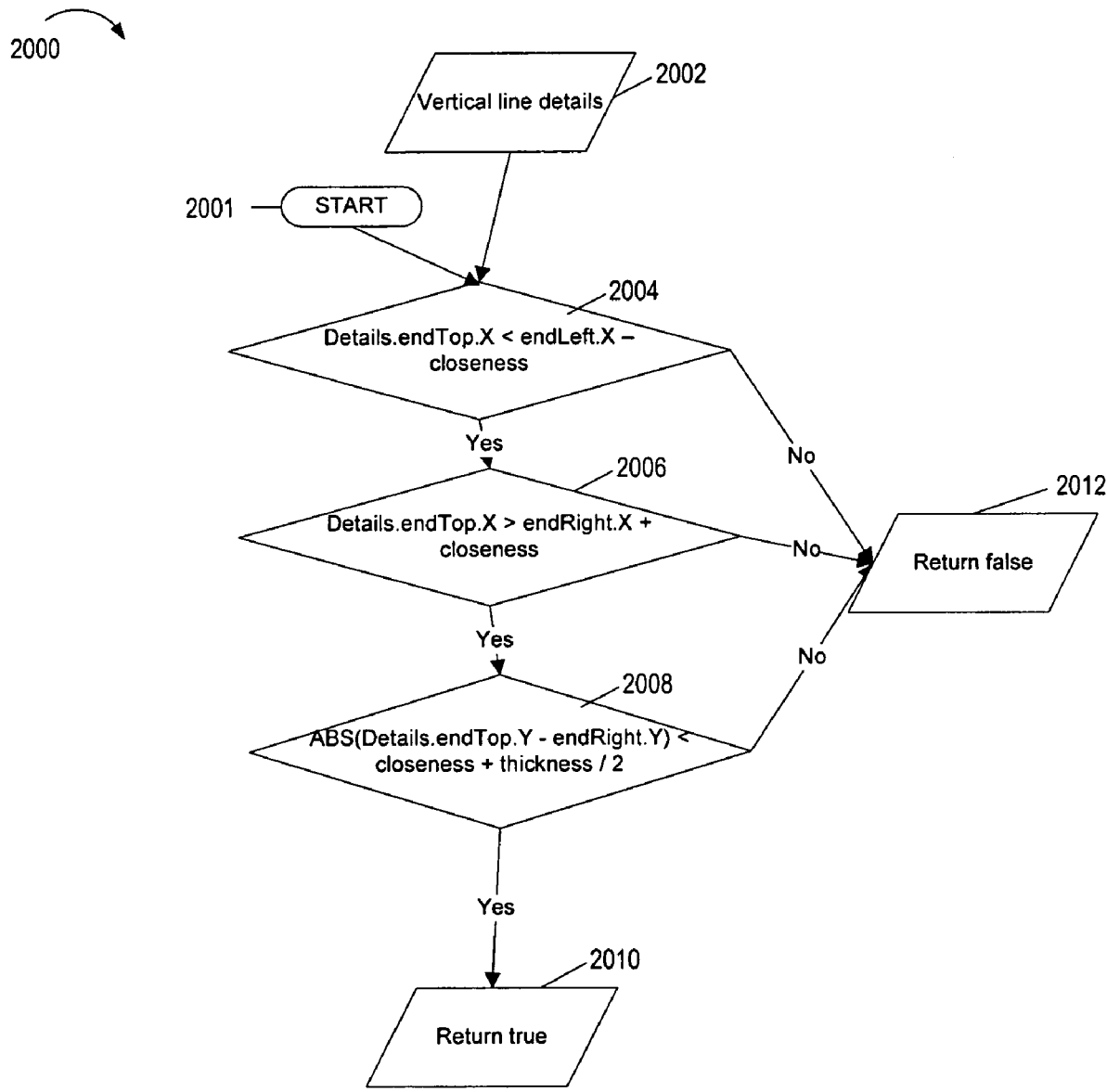
FIG. 20 depicts an exemplary method of detecting if a vertical line butts a horizontal line on the bottom in accordance with the present invention.

FIG. 20 depicts a flowchart 2000 of an exemplary method of detecting if a vertical line butts a horizontal line on the bottom in accordance with the present invention. Exemplary flowchart 2000 is used in some embodiments to implement one or more of step 936 of FIG. 9 and step 1806 of FIG. 18. Operation starts in step 2001 and proceeds to step 2004. Vertical line details 2002 is an input to step 2004. To check to see if a vertical line butts to the bottom of a horizontal line using the method of flowchart 2000 of FIG. 20, the vertical line coordinates included in vertical line details information 2002 are compared to the horizontal line. If the vertical is too far left of the horizontal as determined by a no from the check of step 2004 or too far to the right of the horizontal as determined by a no from the check of step 2006, or the top of the vertical is not close to the horizontal line as determined by a no from the check of step 2008 then the function of flowchart 2000 returns a false in output information 2012. If none of these conditions is true, then the function of flowchart 2000 returns true in output information 2010.

Figure 21:
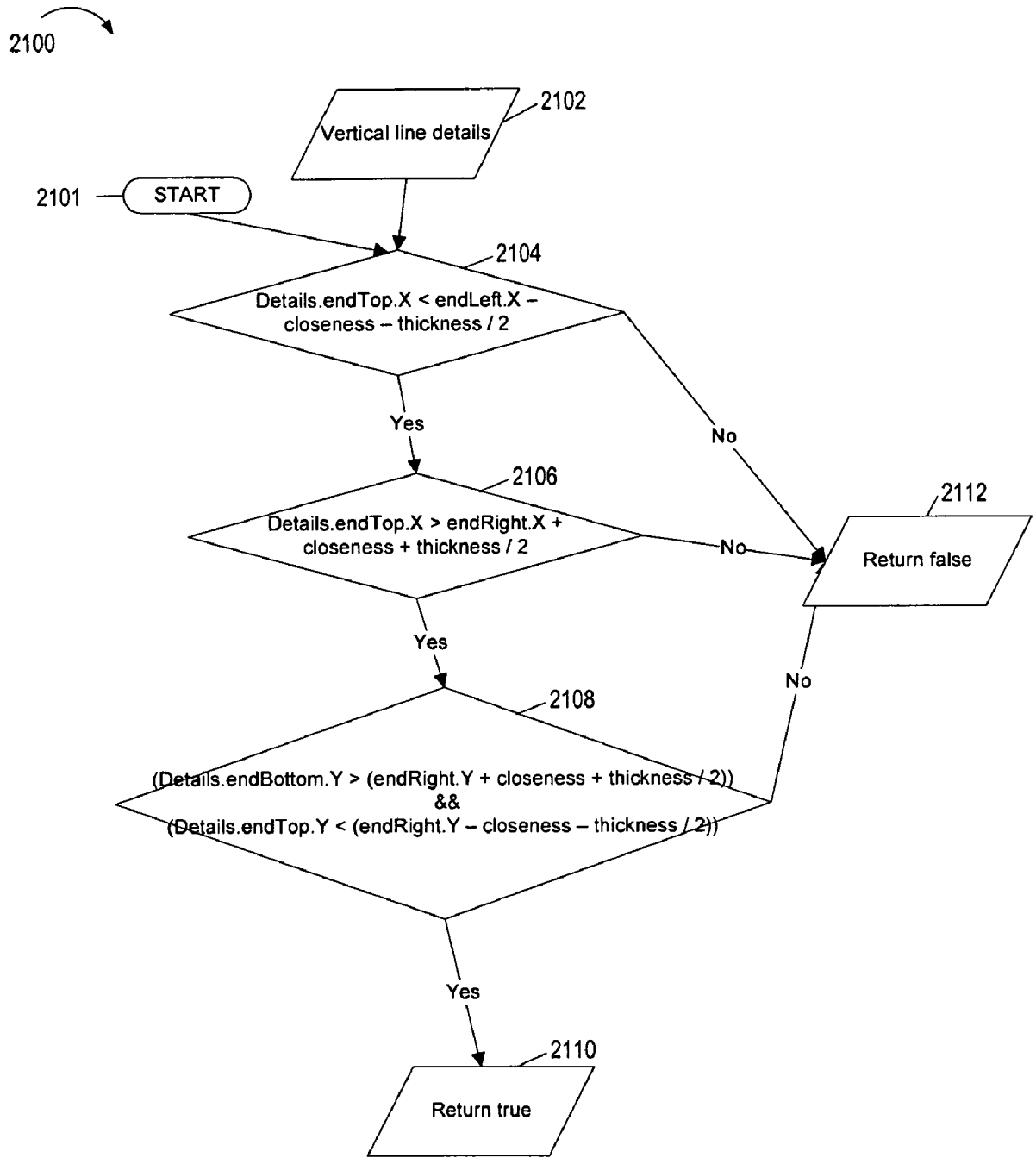
FIG. 21 depicts an exemplary method of detecting if a vertical line intersects a horizontal line and should be split in accordance with the present invention.

FIG. 21 depicts an exemplary method of detecting if a vertical line intersects a horizontal line and should be split in accordance with the present invention. Flowchart 2100 is used in some embodiments, to implement step 914 of FIG. 9. Operation starts in step 2101 and proceeds to step 2104. Vertical line details 2102 is an input to step 2104. To check to see if a vertical line intersects, but doesn't butt, a horizontal line using the method of flowchart 2100 of FIG. 21 the vertical line coordinates included in information 2102 are compared to the horizontal line. If the vertical line is too far left of the horizontal line as determined from a No condition from the check of step 2104, too far to the right of the horizontal as determined from a No condition from the check of step 2106, or either vertical line endpoint falls close to the horizontal line as determined from a No condition from the check of step 2108 the function of flowchart 2100 returns a false in output information 2112. If none of these conditions is true, then the function of flowchart 2100 returns a true in output information 2110.

Figure 22:
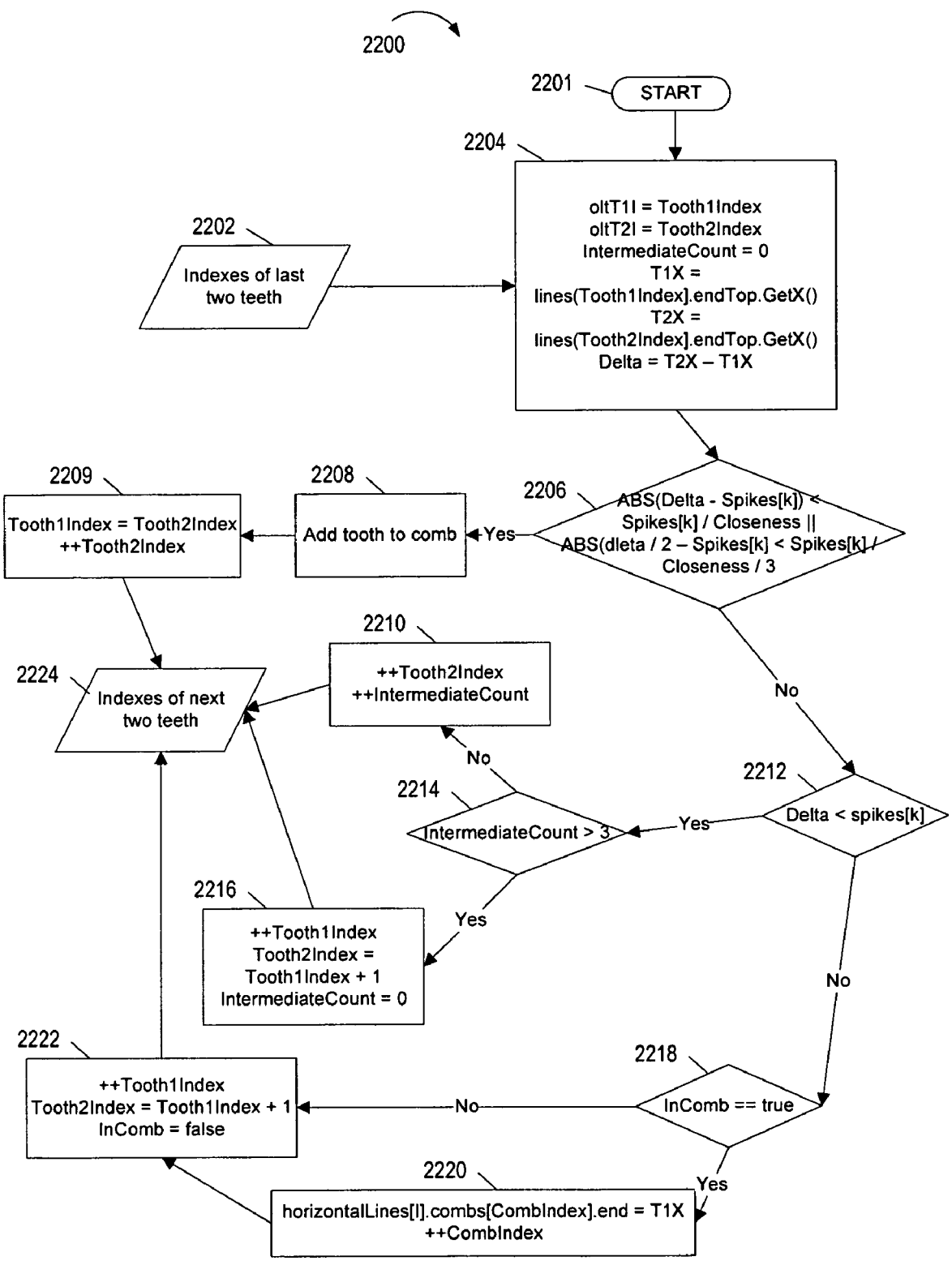
FIG. 22 depicts an exemplary method of searching for the next tooth in a comb in accordance with the present invention.

FIG. 22 depicts a flowchart 2200 of an exemplary method of searching for the next tooth in a comb in accordance with the present invention. Flowchart 2200 may be used to implement step 1520 of FIG. 15. Operation starts in step 2201 and proceeds to step 2204. The process of finding the next tooth in a comb using the method of flowchart 2220 of FIG. 22 involves looking at the last known tooth and a vertical line to its right using input indexes information of the last two teeth 2202. The X coordinates of the known tooth (T1X) and the potential tooth (T2X) are obtained, and the distance between them calculated in step 2204. If the distance is close to that of the current tooth spacing or double the tooth spacing as determined by a Yes condition from the check of step 2206 then operation proceeds from step 2206 to step 2208 since the vertical line is considered a tooth and in step 2208 the tooth is added to the comb. Operation proceeds from step 2208 to step 2209, where the new tooth now becomes the last known tooth, and the search moves to the next vertical line before returning. If the spacing is not correct for a tooth as determined by a No condition from the check of step 2206, then operation proceeds from step 2206 to step 2212, where the spacing is checked to see if it is smaller than a tooth spacing.

If not, the next vertical is chosen for a new search (step 2222), first closing the comb (step 2220) if it is open (step 2218). If the spacing is less than a tooth spacing, then the number of intermediate lines is checked (step 2214). If the number is less than the maximum allowed, then the intermediate line count is incremented and the next vertical is examined. If the intermediate line count is too large as determined from a Yes condition from the check of step 2214, then operation proceeds from step 2214 to step 2216 where the count is reset and the search continues from the next vertical. However, if the intermediate count is not too large as determined by a No condition from the check of step 2214, then operation proceeds from step 2214 to step 2210 where the current candidate tooth is counted as an intermediate line and the next vertical is examined. The function exits with the comb extended, if needed, and the index for the next potential tooth set, information 2224.

Figure 23:
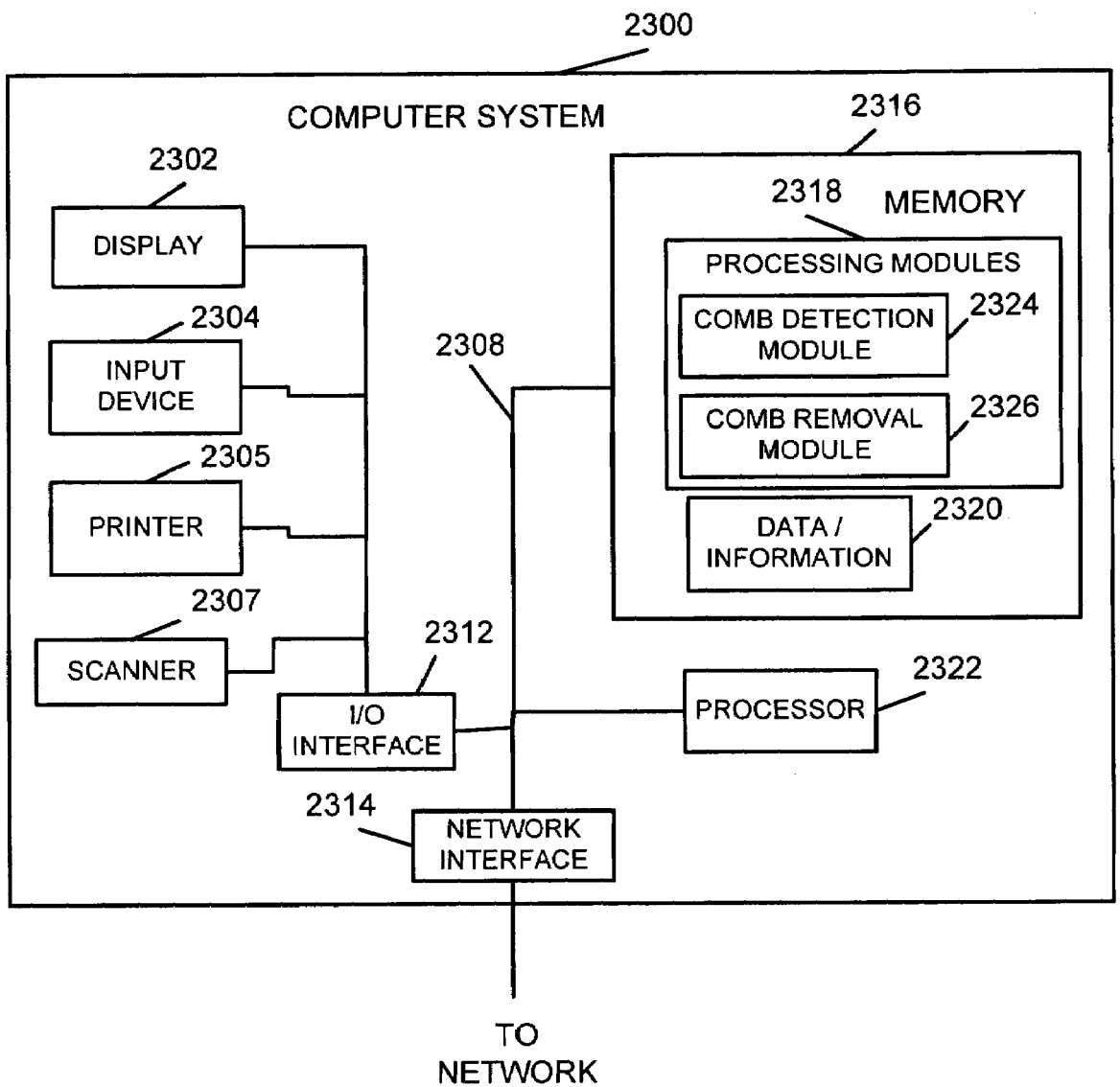
FIG. 23 illustrates an exemplary computer system for processing image data implemented in accordance with various exemplary embodiments of the present invention.

FIG. 23 illustrates an exemplary computer system 2300 for processing image data implemented in accordance with various exemplary embodiments of the present invention. The computer system 2300 includes a display device 2302, input device 2304, printer 2305, scanner 2307, memory 2316, processor 2322, network interface 2314, and I/O interface 2312. The display device 2302 may be used, e.g., to display images resulting from processing implemented in accordance with the present invention. The printer 2305 may be used to obtain hard copy of images resulting from processing in accordance with the present invention. The scanner 2307 provides one method to input images to be processed, e.g., images including combs which are to be detected and/or removed in accordance with the present invention. Input device 2304 may be, e.g. a keyboard or other user input device. The display 2302, input device 2304, printer 2305, and scanner 2307 are coupled to a bus 2308 by I/O interface 2312. The bus 2308 is also coupled to the memory 2316, processor 2322 and network interface 2314. The network interface 2314 couples the internal components of the system 2300 to an external network, e.g., the Internet, thereby allowing the system 2300 to receive and send image data over a network. The processor 2322 controls operation of the computer system 2300 under direction of software modules and/or routines stored in the memory 2316. Memory 2316 includes data/information 2320, and processing modules 2318, e.g., software routines, e.g., machine executable instructions, for implementing one or more of the image processing methods of the present invention. When executed by processor 2322, the processing module 2318 implements methods of the present invention, e.g., causing the detection and/or removal of combs in image data.

Processing modules 2318 include comb detection module 2324 and comb removal module 2326. The comb detection module 2324 perform various operations related to detection of combs in image data in accordance with the methods of the present invention. The comb removal module 2326, which is responsive to output information from comb detection module 2324, removes detected combs from image data.

Data/information 2320 includes image data to be processed, image data which has been processed, intermediate processing data, processing control information, various statistical information corresponding to lines within images, various statistical information corresponding to combs, and various location information corresponding to combs. The resulting processed image data is stored in memory 2316 for future use or additional processing or supplied to display device 2302 to be displayed or supplied to printer 2305 to be printed or communicated over network interface 2314.

Figure 24:
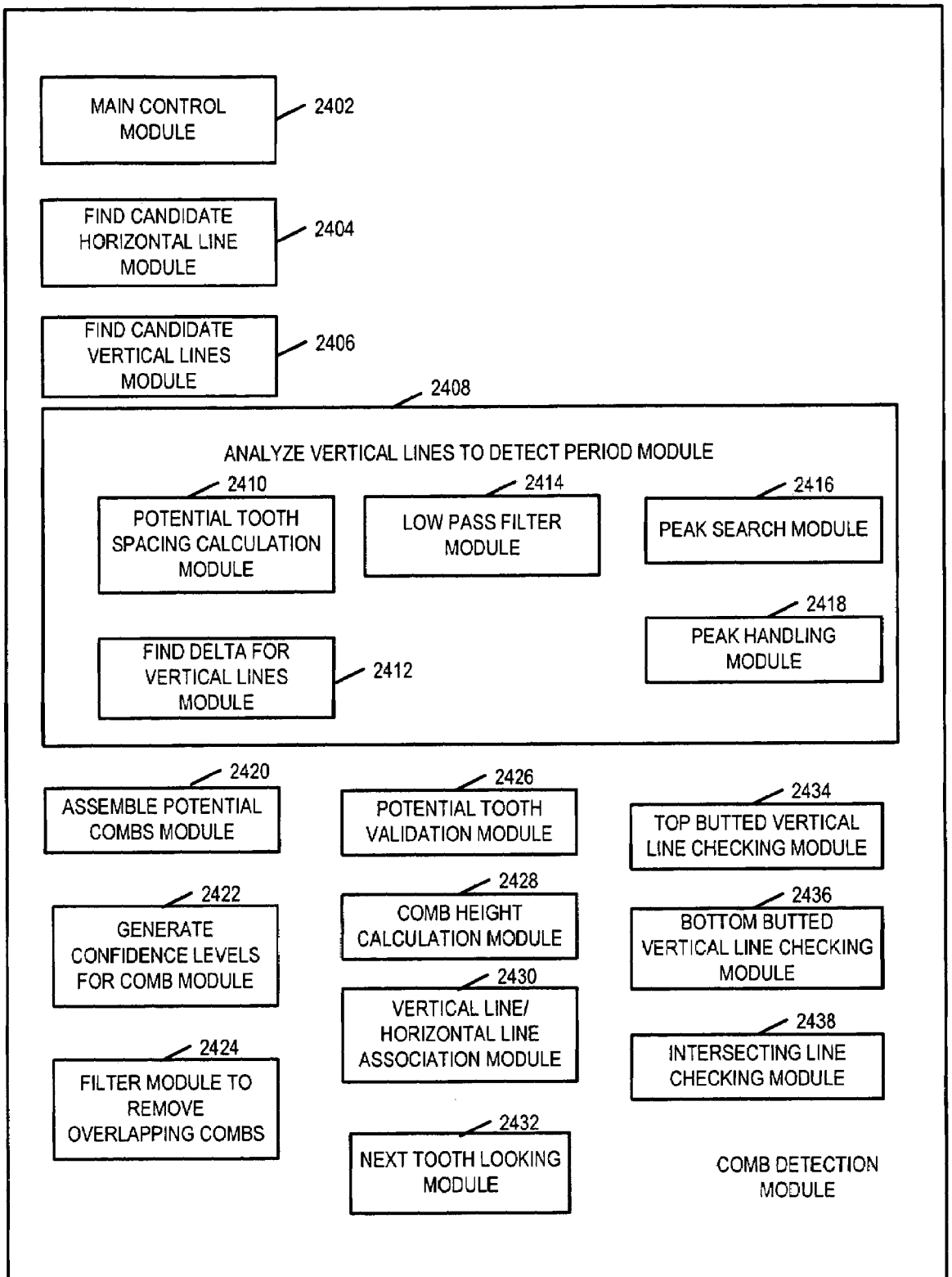
FIG. 24 is a drawing of an exemplary comb module which may be the comb detection module of computer system of FIG. 23.

FIG. 24 is a drawing of an exemplary comb detection module 2324'. Exemplary image processing module 2324' may be the comb detection module 2324 of computer system 2300 of FIG. 23. Comb detection module 2324 includes a main control module 2402, a find candidate horizontal line module 2404, a find candidate vertical lines module 2406, an analyze vertical lines to detect period module 2408, an assemble potential combs module 2420, a generate confidence level for comb module 2422, a filter module to reduce overlapping combs 2422, a potential tooth validation module 2426, a comb height calculation module 2428, a vertical line/horizontal line association module 2430, a next tooth looking module 2432, a top butted vertical line checking module 2324, a bottom butted vertical line checking module 2436, and an intersecting line checking module 2438. Analyze vertical lines to detect period module 2408 includes a potential tooth spacing calculation module 2410, a find delta for vertical lines module 2412, a low pass filter module 2414, a peak search module 2416, and a peak handling module 2418.

Main control module 2402 controls operations to perform the method of FIG. 7. Find candidate horizontal line module 2404 performs the method of the flowchart of FIG. 8. Find candidate vertical lines module 2404 performs the method of the flowchart of FIG. 9. Analyze vertical lines to detect period module implement the method of step 710 of FIG. 7. Assemble potential combs module 2420 performs the method of the flowchart of FIG. 15. Generate confidence levels for comb module 2422 implements the method of step 714 of FIG. 7. Filter module to remove overlapping combs 2424 implements the method of step 716 of FIG. 7. Potential tooth validation module 2426 performs method of the flowchart of FIG. 16. Comb height calculation module 2428 performs the method of the flowchart of FIG. 17. Vertical line/horizontal line association module 2430 performs the method of the flowchart of FIG. 18. Next tooth looking module 2432 performs the method of the flowchart of FIG. 22. Top butted vertical line checking module 2434 performs the method of the flowchart of FIG. 19. Bottom butted vertical line checking module 2436 performs the method of the flowchart of FIG. 20. Intersecting line checking module 2438 performs the method of the flowchart of FIG. 21.

Potential tooth spacing calculation module 2410 performs the method of the flowchart of FIG. 10. Find delta for vertical line module 2412 performs the method of the flowchart of FIG. 11. Low pass filter module 2412 performs the method of the flowchart of FIG. 12. Peak search module 2416 performs the method of the flowchart of FIG. 13. Peak handling module 2418 performs the method of the flowchart of FIG. 14.

Figure 25:
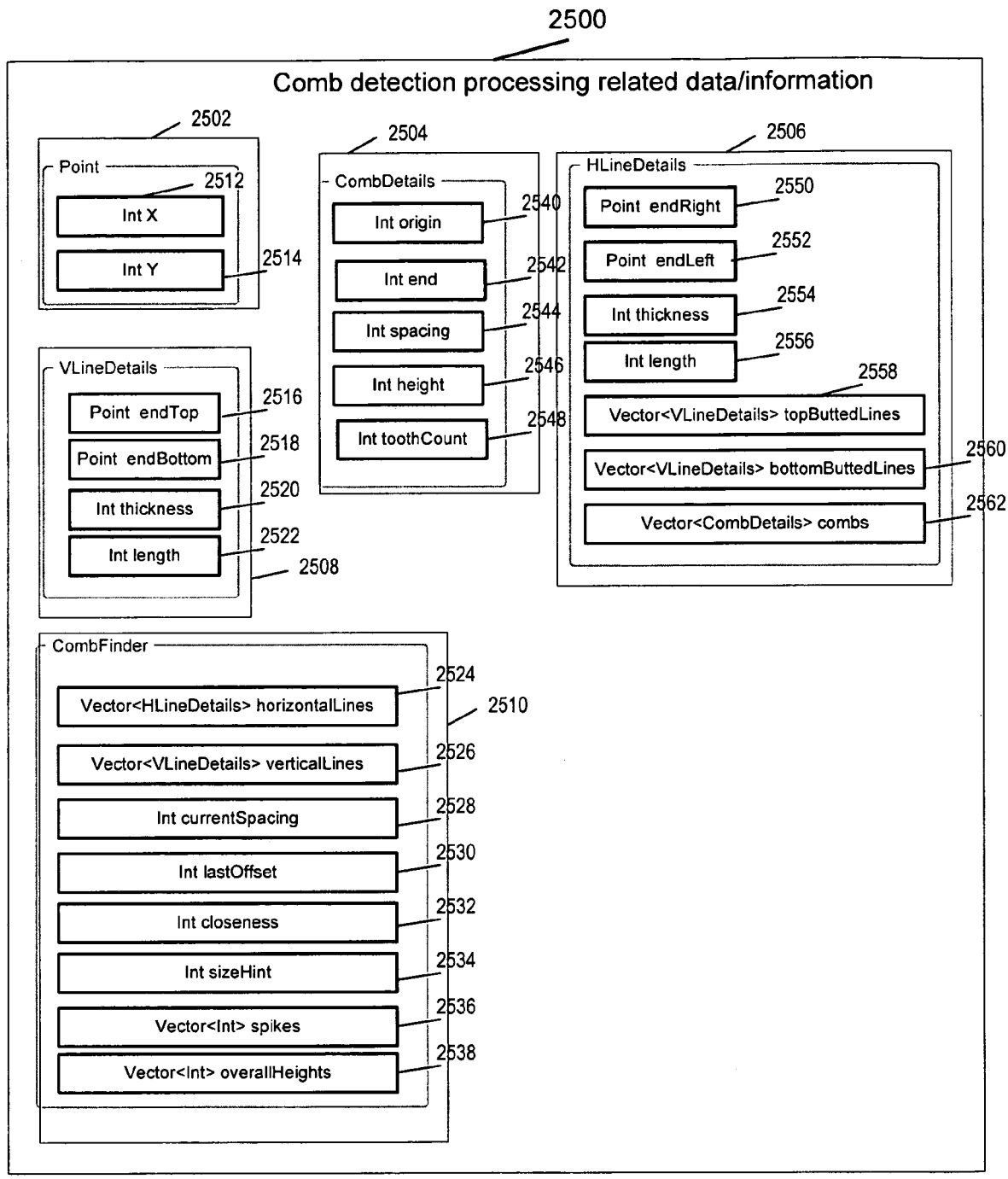
FIG. 25 is a drawing of exemplary comb detection processing related data/information which may be included in the computer system of FIG. 23.

FIG. 25 is a drawing of exemplary comb detection processing related data/information 2500. Comb detection processing related data/information 2500, is in some embodiments, included as part of data/information 2320 in the computer system of FIG. 23. Comb detection processing related data/information 2500 includes point information 2502, vertical line details information 2508, comb details information 2504, horizontal line details information 2506, and comb finder information 2510. Point 2502 includes an X value 2512 and a Y value 2514, e.g., coordinate information. Vertical line details information 2508 includes point information corresponding to a end top point of the vertical line 2516, point information corresponding to and end bottom point of the line 2518, a value representing line thickness 2520, and a value representing line length 2522. Comb details information 2504 includes comb origin information 2540, comb end information 2524, comb tooth spacing information 2544, comb tooth height information 2546, and comb tooth count information 2548. Horizontal line details information 2506 includes point information corresponding to the right end of the horizontal line 2550, point information corresponding to the left end of the horizontal line 2552, a value representing horizontal line thickness 2554, a value representing horizontal line length 2556, a vector or vertical line details information corresponding to vertical lines which butt the top of the horizontal line 2558, a vector of vertical lines details information corresponding to vertical lines which but the bottom of the horizontal line 2560, and a vector of comb details corresponding to the horizontal line 2562. Comb finder information 2510 includes a vector of horizontal line details information corresponding to the horizontal lines to be evaluated 2524, a vector of vertical line details information corresponding to the vertical lines 2526, current spacing information 2528, a last Offset value 2530, a closeness value 2532, a sizeHint value 2534, a vector of spike information 2536 and a vector of overallHeights 2538. Although a single set for each of point information, comb details information, horizontal line details information, vertical line details information, and comb finder information has been shown, it is to be understood that information 2500 can, and generally does, include a plurality of one or more of the different types of described information, e.g., corresponding to multiple points being considered, corresponding to multiple horizontal lines being processed, corresponding to multiple vertical lines being processed, corresponding to multiple combs, etc.

Figure 26:
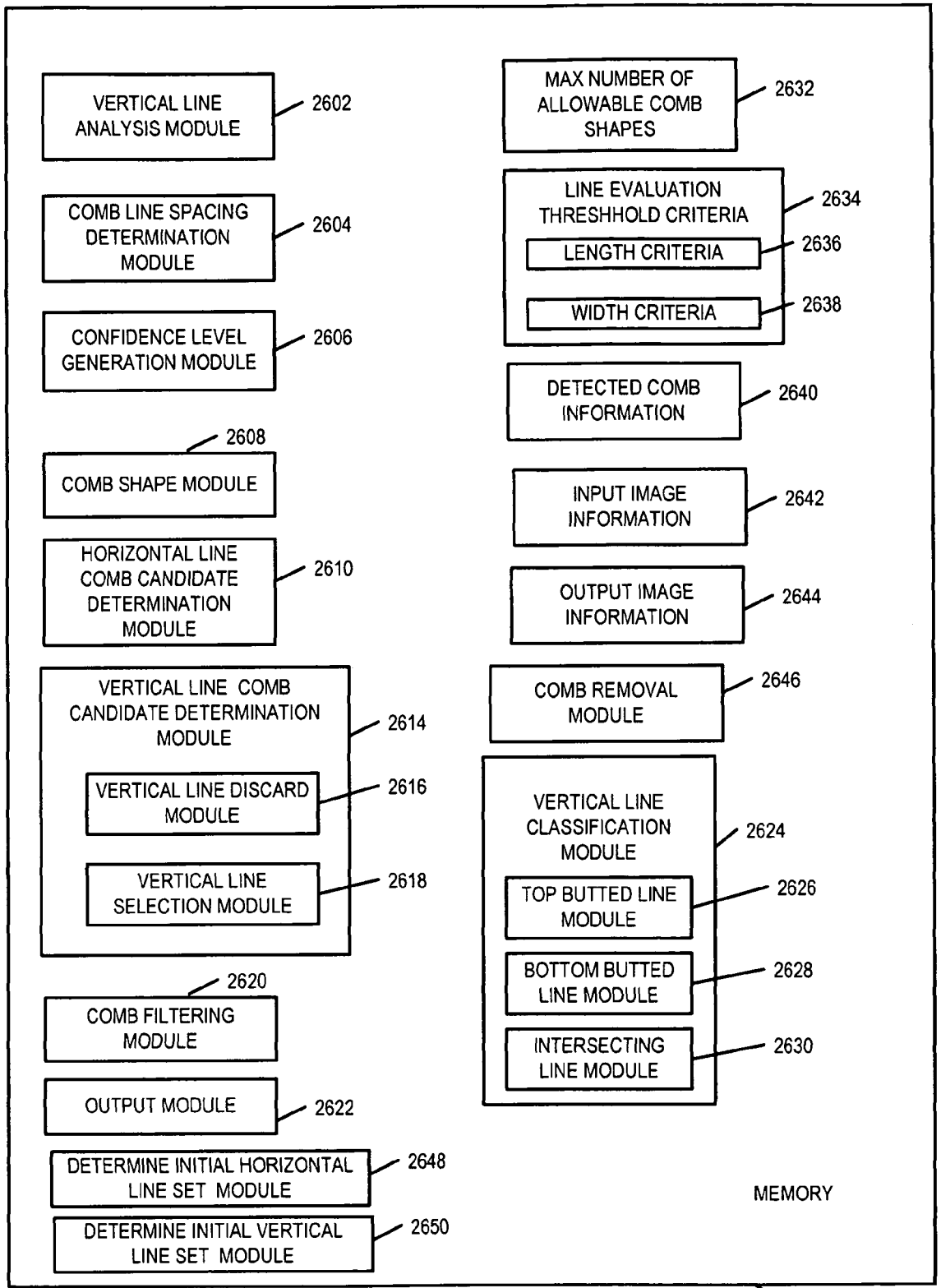
FIG. 26 is a drawing of an exemplary memory used in various embodiments of the present invention.

FIG. 26 is a drawing of an exemplary memory 2316' used in various embodiments of the present invention. Exemplary memory 2316' may be an alternative to memory 2316 used in exemplary computer system 2300 of FIG. 23.

Memory 2316' includes routines and data/information. The processor, e.g., processor 2322, executes the routines and uses the data/information in memory 2316' to control the operation of the computer system, e.g., computer system 2300, and implement methods of the present invention.

Memory 2316' includes a vertical line analysis module 2602, a comb line spacing determination module 2604, a confidence level generation module 2606, a comb shape module 2608, a horizontal line comb candidate determination module 2610, a vertical line comb candidate determination module 2614, a comb filtering module 2620, an output module 2622, a vertical line classification module 2624, a comb removal module 2646, a determine initial horizontal line set module 2648, and a determine initial vertical line set module 2650. Vertical line comb candidate determination module 2614 includes a vertical line discard module 2616 and a vertical line selection module 2618. Vertical line classification module 2624 includes a top butted line module 2626, a bottom butted line module 2628, and an intersecting line module 2630.

Vertical line analysis module 2602 analysis at least some vertical lines in an image to detect the periodicity of at least some sets of vertical lines included in the image. Comb vertical line spacing determination module 2604 determines possible comb vertical line spacings, e.g., a plurality of possible comb line vertical line spacings, from the determined periodicity of different ones of said at least some sets of vertical lines. Confidence level generation module 2606 generates confidence levels, for at least some of determined possible comb vertical line spacings, said confidence level being indicative of the probability that the determined comb vertical line spacing corresponds to a comb in an image being examined. Comb shape module 2608 generates a list of comb shapes based on the generated confidence levels. Horizontal line comb candidate determination module 2610 processes a list of lines to identify horizontal lines which may be part of a comb. Vertical line comb candidate determination module 2614 identifies vertical lines in an image being examined which may be part of a comb. Vertical line discard module 2616 discards from consideration vertical lines which do not touch a horizontal line. Vertical line selection module 2618 selects, as identified vertical lines, one or more vertical lines which exceed a minimum vertical line length and touch at least one horizontal line. Comb filtering module 2620 filters a list of comb shapes, e.g., a list of identified potential combs, based on generated confidence levels to remove at least some comb shapes which overlap other comb shapes in the generated list of comb shapes. Output module 2622 outputs the filtered list of comb shapes, e.g., outputting information identifying the position of identified combs in an image. Comb removal module 2646 removes detected combs from an image being processed. Vertical line classification module 2624 classifies vertical lines with respect to an attachment to a horizontal line which may be part of a comb. Top butted line module 2626 identifies a vertical line as attaching to the top side of a horizontal line; bottom butted line module 2628 identifies a vertical line as attaching to the bottom of a horizontal line; intersecting line module 2630 identifies a vertical line as intersecting a horizontal line to such an extend that the vertical line may be divided into two vertical lines, one to be considered a top butted vertical line and the other to be considered a bottom butted vertical line with respect to the horizontal line under consideration. Determine initial horizontal line set module 2648 determines from an input image, e.g., a scanned image of a form, an initial set of horizontal lines to be subsequently evaluated. Determine initial vertical line set module 2650 determines from an input image an initial set of vertical lines to be subsequently evaluated.

Memory 2316' also includes maximum number of allowable comb shapes 2632, line evaluation threshold criteria 2634, detected comb information 2640, input image information 2640, and output image information 2644. Line evaluation threshold criteria 2634 includes length criteria 2636 and width criteria 2638, e.g., predetermined values used in evaluating whether a line should be considered to be part of a comb. Length criteria 2636 may include minimum length criteria used for considering a line to be part of a comb, width criteria 2638 may include maximum width criteria used for considering whether a line can be considered part of a comb. Maximum number of allowable comb shapes 2632, e.g., a stored predetermined value, is used for limiting the filtered list of comb shapes to a predetermined number of comb shapes which are determined to have the highest confidence level. Detected comb information 2640 includes comb location information, comb characteristics information, e.g., width, number of teeth, tooth spacing, origin, etc, and comb confidence information. Input image information 2640 includes image information, e.g., information representing forms with combs and alphanumeric characters. Output image information 2644 includes detected comb information and/or information representing a processed input image with the detected combs having been removed.

Various features of the present invention are implemented using modules. Such modules may be implemented using software, hardware or a combination of software and hardware. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A method of processing an image to detect combs in the image, the method comprising:

operating a processor to analyze at least some vertical lines in said image to detect periodicity of at least some sets of vertical lines included in said image;

determining a plurality of possible comb vertical line spacings from the detected periodicity of different ones of said at least some sets of vertical lines;

generating confidence levels, for at least some of said determined possible comb vertical line spacings, said confidence level being indicative of the probability that the determined possible comb vertical line spacing corresponds to a comb included in said image; and generating a list of comb shapes based on the generated confidence levels.

2. The method of claim 1, further comprising:

prior to analyzing said at least some vertical lines, processing a list of lines to identify horizontal lines which may be part of a comb.

3. The method of claim 2, wherein said horizontal lines which may be part of a comb include lines which are longer than a threshold minimum length and excludes horizontal lines which are shorter than said threshold minimum length.

4. The method of claim 3, further comprising:

prior to analyzing at least some vertical lines, identifying vertical lines in said image which may be part of a comb, said step of identifying vertical lines which may be part of a comb including:

discarding from consideration vertical lines which do not touch a horizontal line; and selecting, as identified vertical lines, one or more vertical lines which exceed a minimum vertical line length and touch at least one horizontal line, said at least some vertical lines being a selected vertical lines.

5. The method of claim 4, further comprising:

filtering the list of comb shapes based on the generated confidence levels to remove at least some combs shapes which overlap other comb shapes in said generated list of comb shapes.

6. The method of claim 5, further comprising:

outputting the filtered list of comb shapes.

7. The method of claim 6, further comprising:

limiting the filtered list of comb shapes to a predetermined number of combs shapes which are determined to have the highest confidence levels.

8. An apparatus for processing an image to detect combs in the image, the apparatus comprising:

a memory for storing image data representing said image;

a vertical line analysis module for analyzing at least some vertical lines in said image to detect periodicity of at least some sets of vertical lines included in said image;

a comb vertical line spacing determination module for determining a plurality of possible comb vertical line spacings from the detected periodicity of different ones of said at least some sets of vertical lines;

a confidence level generation module for generating confidence levels, for at least some of said determined possible comb vertical line spacings, said confidence level being indicative of the probability that the determined possible comb vertical line spacing corresponds to a comb included in said image; and a comb shape module for generating a list of comb shapes based on the generated confidence levels.

9. The apparatus of claim 8, further comprising:

a horizontal line comb candidate determination module for processing a list of lines to identify horizontal lines which may be part of a comb.

10. The apparatus of claim 9, wherein said horizontal lines which may be part of a comb include lines which are longer than a threshold minimum length and excludes horizontal lines which are shorter than said threshold minimum length, the apparatus further comprising:

stored line evaluation threshold criteria.

11. The apparatus of claim 10, further comprising:

a vertical line comb candidate identification module for identifying vertical lines in said image which may be part of a comb.

12. The apparatus of claim 11, wherein said vertical line comb candidate identification module further comprises:

a vertical line discard module for discarding from consideration vertical lines which do not touch a horizontal line; and a vertical line selection module for selecting, as identified vertical lines, one or more vertical lines which exceed a minimum vertical line length and touch at least one horizontal line, said at least some vertical lines being a selected vertical lines.

13. The apparatus of claim 11, further comprising:

a comb filtering module for filtering the list of comb shapes based on the generated confidence levels to remove at least some combs shapes which overlap other comb shapes in said generated list of comb shapes.

14. The apparatus of claim 13, further comprising:

an output module for outputting the filtered list of comb shapes.

15. The apparatus of claim 14, further comprising:

stored information used for limiting the filtered list of comb shapes to a predetermined number of combs shapes which are determined to have the highest confidence levels.

16. The apparatus of claim 14, further comprising:

a comb removal module for removing detected combs from an image being processed.

* * * * *